(12) United States Patent
Konno

(10) Patent No.: US 11,156,883 B2
(45) Date of Patent: Oct. 26, 2021

(54) COLOR FILTER AND METHOD OF MANUFACTURING COLOR FILTER

(71) Applicant: TOPPAN PRINTING CO., LTD., Tokyo (JP)

(72) Inventor: Kodai Konno, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 637 days.

(21) Appl. No.: 15/882,341

(22) Filed: Jan. 29, 2018

(65) Prior Publication Data

US 2018/0157133 A1 Jun. 7, 2018

Related U.S. Application Data

(63) Continuation of application No. PCT/JP2016/072375, filed on Jul. 29, 2016.

(30) Foreign Application Priority Data

Aug. 3, 2015 (JP) .............................. JP2015-153661

(51) Int. Cl.
| | | |
|---|---|---|
| G02F 1/1335 | (2006.01) | |
| G02F 1/1362 | (2006.01) | |
| B05D 3/00 | (2006.01) | |
| G02B 5/20 | (2006.01) | |
| B05D 1/26 | (2006.01) | |
| B41J 2/16 | (2006.01) | |

(52) U.S. Cl.
CPC ......... *G02F 1/136209* (2013.01); *B05D 1/26* (2013.01); *B05D 3/00* (2013.01); *B41J 2/16* (2013.01); *G02B 5/20* (2013.01); *G02F 1/1335* (2013.01); *G02F 1/133516* (2013.01); *B41J 2202/09* (2013.01)

(58) Field of Classification Search
CPC ......... G02F 1/133516; G02F 1/136209; G02F 1/1335; G02F 1/133514; B41J 2/16; B41J 2202/09; B05D 1/26; B05D 3/00; G02B 5/20

See application file for complete search history.

(56) References Cited

U.S. PATENT DOCUMENTS

| | | | | |
|---|---|---|---|---|
| 6,109,727 A | * | 8/2000 | Akahira | ..................... B41J 2/04 |
| | | | | 347/42 |
| 2008/0113282 A1 | * | 5/2008 | Andoh | .................. B41J 2/2103 |
| | | | | 430/7 |

FOREIGN PATENT DOCUMENTS

| | | |
|---|---|---|
| JP | 59-75205 | 4/1984 |
| JP | 2001-116920 | 4/2001 |
| JP | 2005-40653 | 2/2005 |
| JP | 2010-32914 | 2/2010 |
| JP | 5515627 | 6/2014 |

OTHER PUBLICATIONS

International Search Report dated Oct. 25, 2016 in corresponding International Patent Application No. PCT/JP2016/072375.

* cited by examiner

*Primary Examiner* — Elizabeth A Burkhart

(57) ABSTRACT

A color filter includes: a substrate that transmits light; and a colored layer being formed by an ink jet ink, the colored layer being arranged on a lattice point which is a virtual point in a plurality of virtual lattice patterns arranged on the substrate with a first pitch in a first direction and a second pitch in a second direction, the colored layer being separated in the first direction and the second direction.

4 Claims, 16 Drawing Sheets

COLOR FILTER AND METHOD OF MANUFACTURING COLOR FILTER

CROSS REFERENCE TO RELATED APPLICATIONS

This application is a continuation application based on a PCT Patent Application No. PCT/JP2016/072375, filed Jul. 29, 2016, whose priority is claimed on Japanese Patent Application No. 2015-153661, filed on Aug. 3, 2015, the contents of which are hereby incorporated by reference.

BACKGROUND OF THE INVENTION

Field of the Invention

The present invention relates to a color filter and a method of manufacturing a color filter. For example, the present invention relates to a color filter that is manufactured by an ink jet printing method without forming a black matrix (BM) and a method of manufacturing the same.

Description of Related Art

In the related art, it is known that a color filter is disposed on each pixel of a display in order to colorize the display. Examples of the display include a light emitting type display using a backlight and a reflective type display not using the backlight.

In a color filter used for the light emitting type display, the BM is formed between adjacent colored layers, in order to shield light between the adjacent colored layers.

On the other hand, in a color filter used for the reflective type display, since improving light extraction efficiency is required, the BM is not formed in many cases.

A color filter is manufactured by a photolithography method in many cases. However, it is also proposed to manufacture the color filter by the ink jet method that further reduces the number of processes.

For example, a method of manufacturing a color filter using an ink jet method is disclosed in Patent Document 1 (Japanese Unexamined Patent Application, First Publication No. S59-75205). In the method of manufacturing the color filter, a substance having poor wettability with an ink or a substance having good wettability with an ink is patterned on a substrate, and then a diffusion-preventing pattern or a wettability improver is disposed. Next, a pigment is fixed inside the diffusion-preventing pattern or on the wettability improver by discharging the pigment from ink jet nozzles.

For example, a liquid applying device of manufacturing a liquid crystal device is disclosed in Patent Document 2 (Japanese Unexamined Patent Application, First Publication No. 2005-40653). The liquid applying device vibrates a stage to which a substrate is disposed, and causes the liquid to impact on a substrate in a disorderly manner. Thus, the liquid applying device forms a coated film, in which film quality is uniformed, on the substrate.

For example, an ink jet pattern forming device that increases or reduces a dropping number of inks using a multi-level error diffusion method is disclosed in Patent Document 3 (Japanese Patent No. 5515627). It is disclosed that the ink jet pattern forming device can correct a discharge amount of the inks that form a colored layer by increasing or reducing the dropping number of inks. Therefore, it is possible to reduce the concentration variation in each colored layer due to variation in the discharge amount of the inks. Accordingly, in a case where the color filter is manufactured, the concentration irregularity in the colored layer is reduced.

However, the color filter and the method of manufacturing a color filter of the conventional art have problems as follows.

In a technology described in Patent Document 1, in a case where a color filter without a BM is manufactured, a process of patterning a wettability improver is necessary. Therefore, there is a concern that a manufacturing process is complicated.

In a technology described in Patent Document 2, in order to achieve uniform coated film, liquid is disorderedly impacted on the film. For this reason, if the technology is applied to a color filter that is required to accurately form a colored layer on a fine region corresponding to a pixel, there is a concern that position accuracy of the colored layer is to be poor. In particular, in the color filter in which a BM is not formed, there is a concern that a formation position of the colored layer varies due to variation of an impact position. Moreover, there is a possibility of a mixing of colors of adjacent colored layers occurring.

In a technology described in Patent Document 3, an ink jet head of an ink jet device has a variation in a pitch between discharge nozzles (hereinafter, referred to as nozzle pitch) due to a manufacture error. Accordingly, there is a concern that the impact position of an ink varies along a direction in which discharge nozzles are arranged. In this case, adjacent pitches of drawing lines in a direction orthogonal to a movement direction of the ink jet head vary.

When the adjacent pitches of the drawing lines vary, concentration irregularity is visually recognized at a portion having wide adjacent pitches and a portion having narrow adjacent pitches in some cases. Such a concentration irregularity appears as stripe shaped unevenness, extending in a movement direction of the ink jet head, on the color filter. When the stripe shaped unevenness appears, an image quality of a display is deteriorated.

Although it is considered to reduce an error in the nozzle pitch of the ink jet head, a tolerance of an adjacent pitch error in which a stripe is not visually recognized is extremely small. Therefore, a tolerance of a machining error in the nozzle pitch is also extremely small. Accordingly, there is a concern that a manufacturing cost of the ink jet head increases.

SUMMARY OF THE INVENTION

The present invention is made in consideration of the above described problems, and an object thereof is to provide a color filter and a method of manufacturing a color filter which are capable of suppressing generation of stripe shaped unevenness due to non-uniformity of the nozzle pitch of the ink jet head.

In order to solve the above problems, a color filter according to a first aspect of the present invention includes: a substrate that transmits light; and a colored layer being formed by an ink jet ink, the colored layer being arranged on a lattice point which is a virtual point in a plurality of virtual lattice patterns arranged on the substrate with a first pitch in a first direction and a second pitch in a second direction, the colored layer being separated in the first direction and the second direction. In each row of the plurality of the lattice patterns arranged in the first direction, when a maximum value is denoted by $\delta max$ and a minimum value is denoted by $\delta min$ in a positional deviation amount in the first direction between a center of the colored layer and the lattice point, and a value obtained by averaging δmax−δmin in the lattice patterns arranged in the first direction is defined as a colored layer positional deviation range E, the colored layer positional deviation range E is 1 μm to 10 μm, and in each column of the plurality of the lattice patterns arranged in the second direction, a position of the center of the colored layer in the first direction changes periodically with respect to the lattice point.

When an amplitude of periodic change toward the first direction in the colored layer of each column is defined as an amplitude ΔX, the amplitude ΔX may satisfy the following Equation (1).

$$0.5 \cdot \frac{E}{2} \leq \Delta X \leq 1.5 \cdot \frac{E}{2} \tag{1}$$

In each column, when a coordinate value of the center of the colored layer in the second direction is denoted by y, displacement x of the center of the colored layer in the first direction with respect to the lattice point may be represented by the following Equation (2).

$$x = \Delta X \sin\left(\frac{2\pi}{p} \cdot y + \alpha\right) \tag{2}$$

Here, p is a constant that represents a wavelength of vibration longer than a width of the colored layer in the second direction, and α is a constant that represents an initial phase.

The colored layer may be configured with a plurality of unit colored layers, each of the unit colored layers is formed of a different type of ink, and positions of the unit colored layers are different in at least one of the first direction and second direction, and the plurality of the unit colored layers may be respectively arranged on lattice points at positions different from each other in the lattice patterns. In each column of the plurality of the lattice patterns, a position of the center of each of the unit colored layers in the first direction may change periodically with respect to each of the lattice points.

A pixel portion, in which at least the first unit colored layer and the second unit colored layer are assembled, may be disposed on each of pixel portion lattice points which are virtual points in a plurality of virtual pixel portion lattice patterns arranged with the first pitch in the first direction and the second pitch in the second direction, and in the plurality of the pixel portion lattice patterns in the second direction, a position of the center of the pixel portion in the first direction may change periodically with respect to the pixel portion lattice points.

A method of manufacturing a color filter according to a second aspect of the present invention includes: preparing an ink jet head in which a plurality of ink jet nozzles are arranged in a first direction and a substrate that transmits light; relatively moving the ink jet head with respect to the substrate in a second direction intersecting the first direction; and discharging inks onto the substrate from the plurality of ink jet nozzles to form a plurality of colored layers, which are separated from each other, respectively on a plurality of target positions having a first pitch in the first direction, in which, when a range of an error of nozzle positions of the ink jet nozzles in the ink jet head is defined as a head error range $E_H$ where the error causes positional deviation of the colored layers in the first direction to occur, the head error range $E_H$ is 1 μm to 10 μm, when the ink jet head is relatively moved with respect to the substrate in the second direction by a second pitch, discharging inks onto the substrate is started, and wherein the ink jet head is relatively vibrated with respect to the substrate in the first direction at an amplitude not exceeding the first pitch and a wavelength larger than a width of a colored layer in the second direction, thereby causing a formation position of a center of the colored layer in the first direction to change periodically in the second direction in each column of the colored layers arranged in the second direction.

When the amplitude at the time of relatively vibrating the ink jet head with respect to the substrate in the first direction is denoted by ΔX, the amplitude ΔX may satisfy the following Equation (3).

$$0.5 \cdot \frac{E_H}{2} \leq \Delta X \leq 1.5 \cdot \frac{E_H}{2} \tag{3}$$

When a position coordinate in a y-axis that is an axial line passing through the ink jet nozzles and extending in the second direction is denoted by y and a displacement in the position coordinate y in the first direction is denoted by x, a vibration waveform of the ink jet nozzles when the ink jet head is relatively vibrated with respect to the substrate in the first direction may satisfy the following Equation (4).

$$x = \Delta X \sin\left(\frac{2\pi}{p} \cdot y + \beta\right) \tag{4}$$

Here, p is a constant that represents a wavelength of vibration longer than a width of the colored layer in the second direction. β is a constant that represents an initial phase.

The ink jet head may include a plurality of sub-heads capable of independently and respectively forming a plurality of types of unit colored layers different from each other in a position in any one of first direction and second direction. When the ink jet head is relatively vibrated with respect to the substrate in the first direction, the plurality of the sub-heads may be relatively vibrated with respect to the substrate.

The ink jet head may include a plurality of sub-heads capable of independently and respectively forming a plurality of types of unit colored layers different from each other in a position in any one of the first direction and the second direction. When the ink jet head is relatively vibrated with respect to the substrate in the first direction, at least one of the plurality of the sub-heads may be relatively vibrated with respect to the substrate to be different from other sub-heads.

According to the color filter and the method of manufacturing a color filter of the aspects, in the second direction intersecting the first direction in which ink jet head nozzles are arranged, the center of the colored layer of each of columns arranged in the second direction changes periodically in the second direction. Therefore, it is possible to suppress generation of stripe shaped unevenness due to non-uniformity of a nozzle pitch of the ink jet head.

DETAILED DESCRIPTION OF THE INVENTION

Hereinafter, embodiments of the present invention will be described with reference to the accompanying drawings. In all drawings, even in a case of different embodiments, the same or corresponding members are denoted by the same reference signs, and a common description is omitted.

First Embodiment

A color filter according to a first embodiment of the present invention is described.

Figure 1:
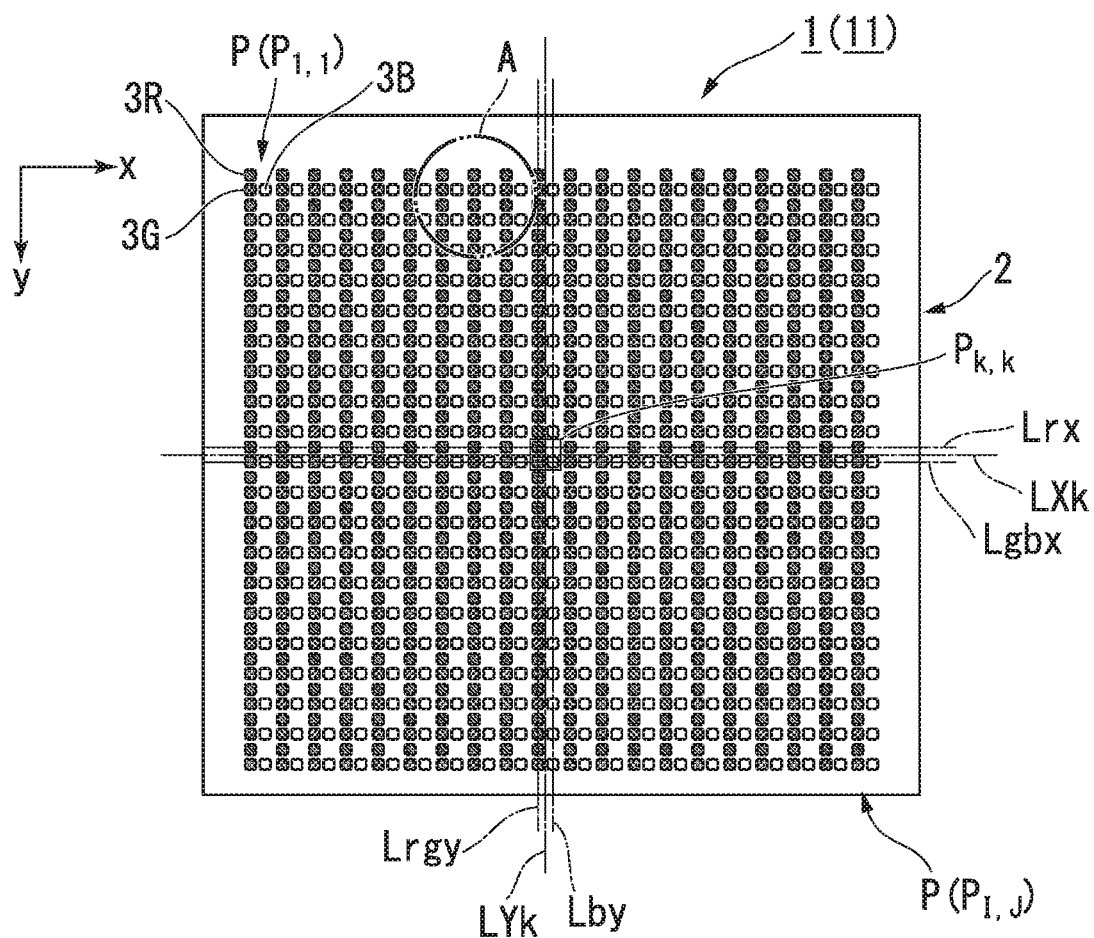
FIG. 1 is a schematic plan view showing an example of a configuration of a color filter according to a first embodiment of the present invention.
Figure 2:
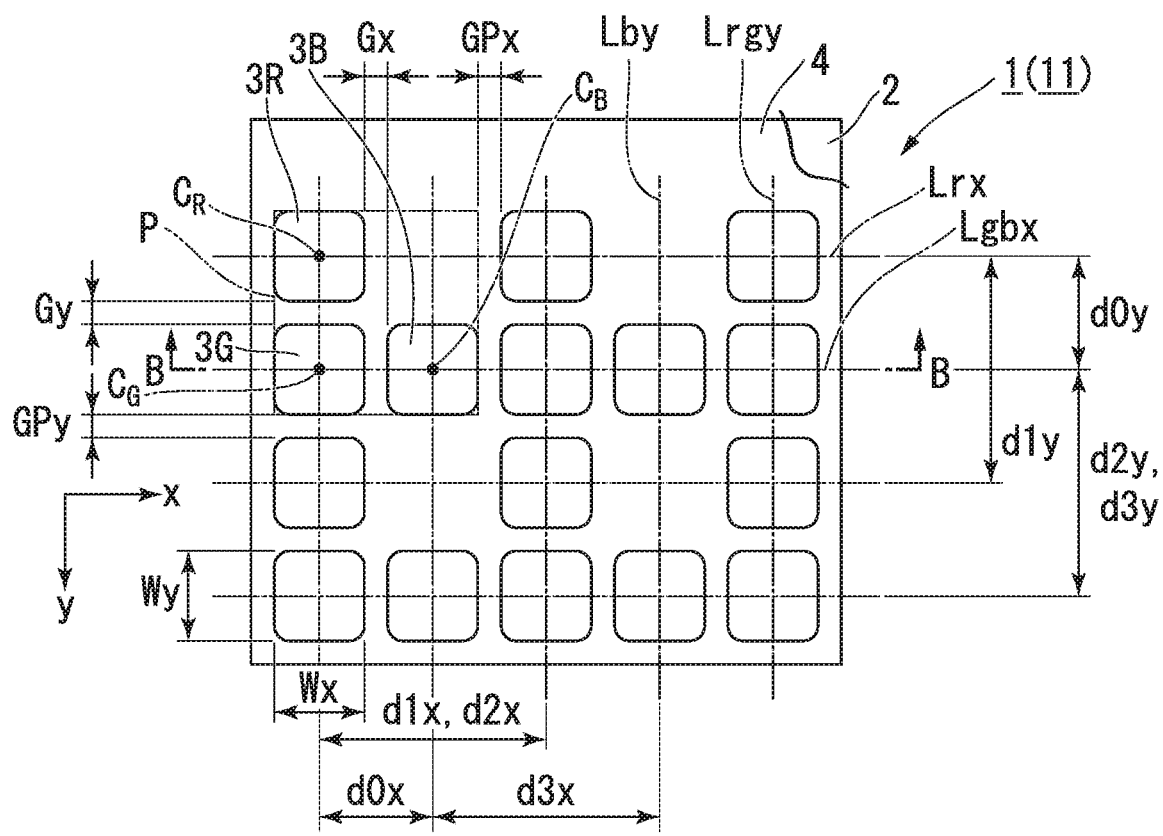
FIG. 2 is a detailed view of an A portion in FIG. 1.
Figure 3:
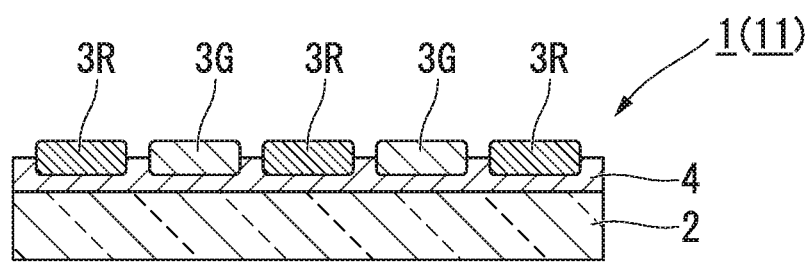
FIG. 3 is a sectional view taken along line B-B in FIG. 2.
Figure 4:
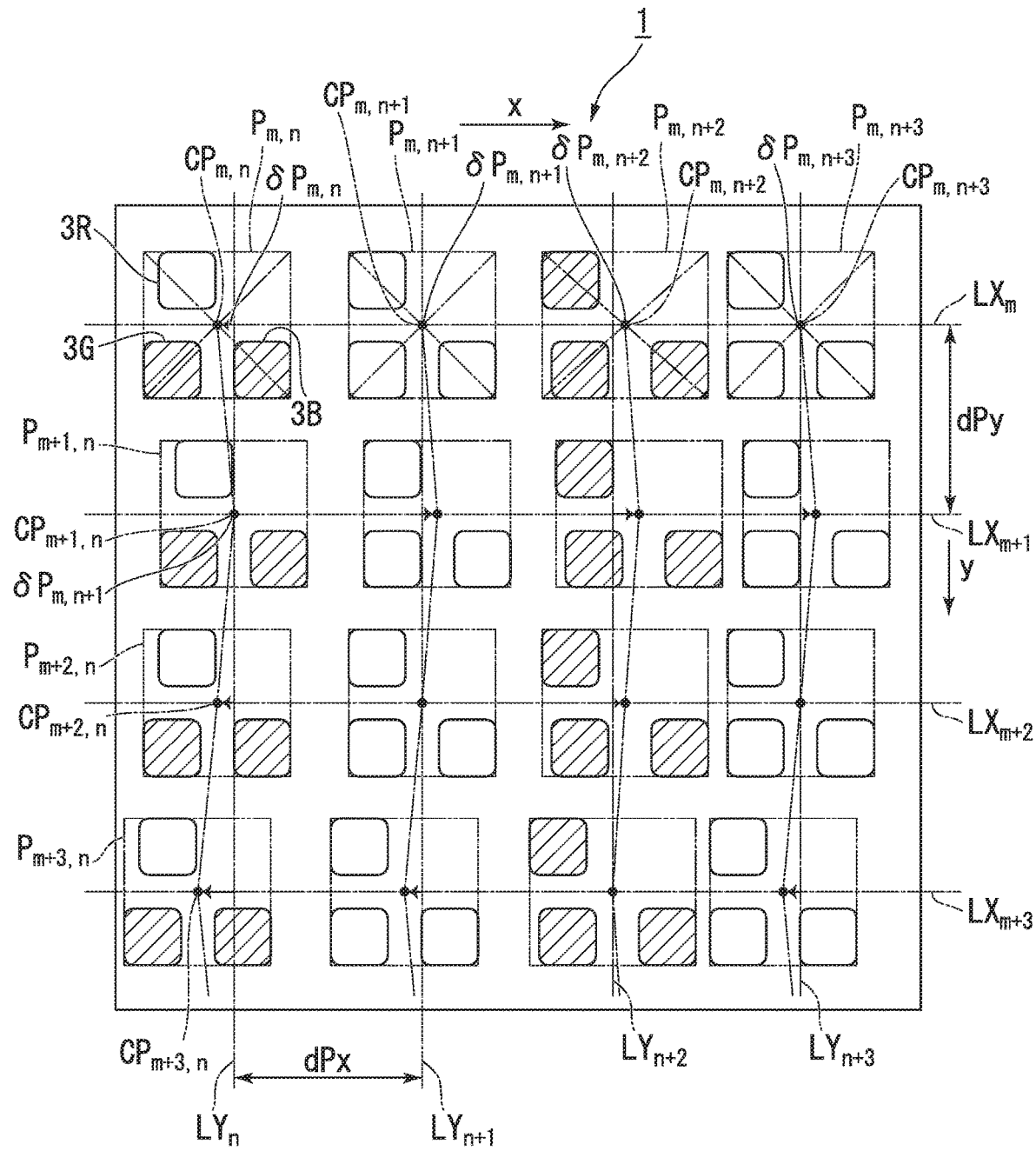
FIG. 4 is a schematic view showing a disposition example of colored layers in the color filter according to the first embodiment of the present invention.
Figure 5:
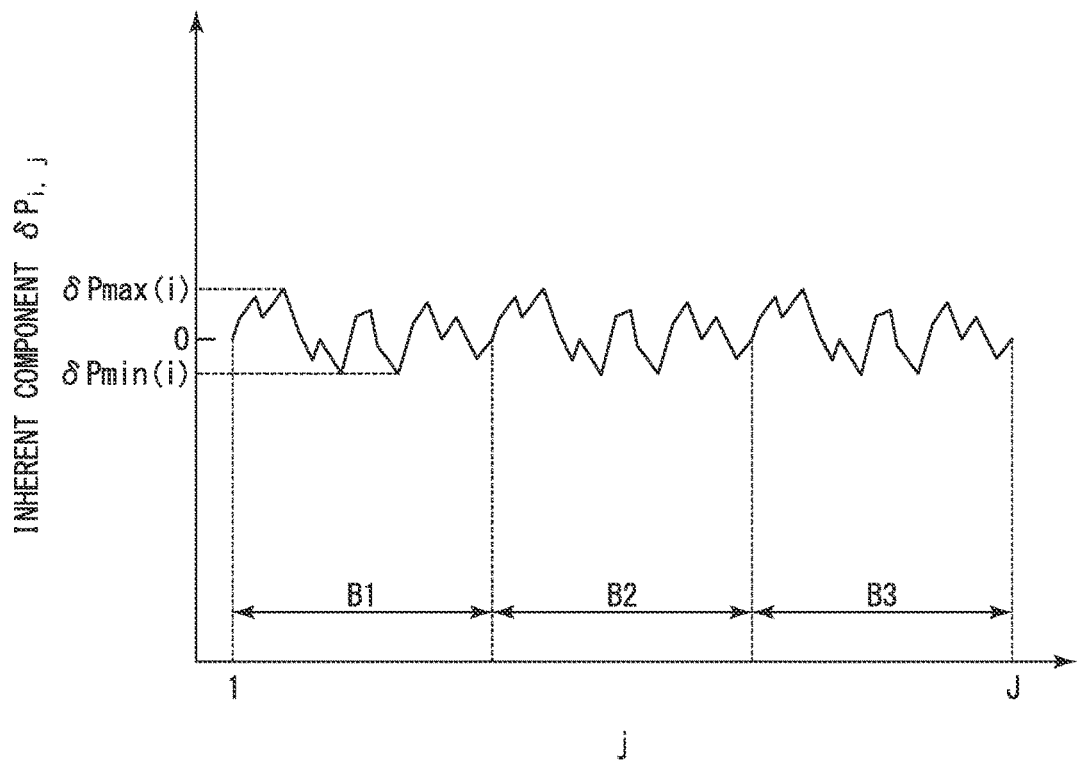
FIG. 5 is a schematic graph showing an example of a pixel deviation amount in the color filter according to the first embodiment of the present invention.

FIG. 1 is a schematic plan view showing an example of a configuration of a color filter according to a first embodiment of the present invention. FIG. 2 is a detailed view of an A portion in FIG. 1. FIG. 3 is a sectional view taken along line B-B in FIG. 2. FIG. 4 is a schematic view showing a disposition example of colored layers in the color filter according to a first embodiment of the present invention. FIG. 5 is a schematic graph showing an example of a pixel deviation amount in the color filter according to a first embodiment of the present invention.

In FIG. 5, a horizontal axis represents a column number j, and a vertical axis represents an inherent component $\delta P_{i,j}$ of positional deviation.

As shown in FIG. 1, in the color filter 1 according to the present embodiment, a first colored layer 3R (colored layer, unit colored layer), a second colored layer 3G (colored layer, unit colored layer), and a third colored layer 3B (colored layer, unit colored layer) are regularly arranged on a substrate 2.

The first colored layer 3R, the second colored layer 3G, and the third colored layer 3B are formed by inks discharged by an ink jet device which will be described later.

The first colored layer 3R is formed by a red ink.

The second colored layer 3G is formed by a green ink.

The third colored layer 3B is formed by a blue ink.

The color filter 1 of the present embodiment can be suitably used to a reflective type display (not shown) that performs color display.

For example, the reflective type color display includes subpixels that perform display of red, greed, and blue. Reflectance of each of the subpixels may change in multiple levels.

In a case where each of the first colored layer 3R, the second colored layer 3G, and the third colored layer 3B of the color filter 1 is disposed on a position facing each subpixel, a color in which reflected light according to the reflectance of the subpixel is added and mixed is displayed.

As the subpixel, a subpixel for white changing brightness of the reflected light may be provided. In this case, only a transparent material is disposed on a portion of the color filter 1 facing the subpixel for white.

A certain number of the subpixels are assembled together to constitute a display unit pixel. For example, it is possible that one pixel is constituted in a certain region including each of subpixels for red, green, blue, and white.

Hereinafter, a case where a pixel is constituted by one subpixel for white and total three subpixels for red, green, and blue of a display (not shown) will be described as an example.

A substrate 2 is not particularly limited as long as the substrate 2 has light transmission property and is a material to which printing can be performed by the ink jet method. It is more preferable that a surface of the substrate 2 is smooth.

Examples of a material of the substrate 2 include polyethylene terephthalate (PET), polyethylene naphthalate (PEN), polypropylene (PP), and the like.

In the surface of the substrate 2, according to the type of inks, an image receiving layer for fixing the ink may be formed. The image receiving layer has the light transmission property and formed of a suitable material capable of fixing the ink by absorbing at least some of inks. Moreover, it is preferable that the image receiving layer has an appropriate strength, flatness, thermal resistance, and the like.

As the ink, an ink jet ink such as a solvent-based ink jet ink and a water-based ink jet ink is an exemplary example. The ink jet ink means an ink that can be applied by the ink jet method.

Examples of the material of the image receiving layer suitable for these inks can include a urethane resin, an acrylic resin, and the like.

In a case where a functional ink such as a UV curable ink and a wax type ink which are good in fixability is used as the ink, if the material of the substrate 2 is PET, PEN, or the like, it is also possible to print by the ink jet method without using the image receiving layer.

In the following, a case of using the PET as the substrate 2 and using the solvent-based ink jet ink as the ink is an exemplary example. The inks used to the first colored layer 3R, the second colored layer 3G, and the third colored layer 3B respectively include a red pigment, a green pigment, and a blue pigment.

The color filter 1 of the present embodiment is formed by stacking the image receiving layer 4 having the light transmission property on the surface of the substrate 2, as shown in FIGS. 2 and 3. In the color filter 1, the first colored layer 3R, the second colored layer 3G, and the third colored layer 3B are fixed onto the image receiving layer 4.

As a material of the image receiving layer 4, the urethane resin is used.

As shown in FIG. 2, when viewed in a layer thickness direction, the first colored layer 3R, the second colored layer 3G, and the third colored layer 3B have an approximately rectangular shape. Hereinafter, centers of the first colored layer 3R, the second colored layer 3G, and the third colored layer 3B are respectively referred to as a first colored layer center $C_R$, a second colored layer center $C_G$, and a third colored layer center $C_B$.

The first colored layer center $C_R$, the second colored layer center $C_G$, and the third colored layer center $C_B$ can be obtained by detecting the centroid position of the first colored layer 3R, the second colored layer 3G, and the third colored layer 3B, for example, by an image instrumentation and the like.

As will be described below, the first colored layer 3R, the second colored layer 3G, and the third colored layer 3B are formed by discharging the ink while scanning an ink jet head, in which a plurality of ink jet nozzles are disposed in an x direction (first direction), in the x direction and y direction (second direction) intersecting the x direction.

Hereinafter, the x direction is referred to as a main scanning direction (first direction) and the y direction (second direction) is referred to as a sub-scanning direction in some cases.

An intersection angle between the x direction and the y direction can be determined in accordance with a disposition of subpixels of the display using the color filter 1. In the present embodiment, the intersection angle is 90°, but is not limited thereto.

Hereinafter, in a case where a position on the color filter 1 is described, a virtual lattice point (virtual point) and a virtual straight grid line connecting the lattice points may be used.

As shown in FIG. 2, the first lattice points are disposed on a virtual rectangular lattice pattern (lattice pattern) with a first lattice point pitch $d1x$ (first pitch) which is a pitch in the x direction (main scanning direction) and a first lattice point pitch $d1y$ (second pitch) which is a pitch in the y direction (sub-scanning direction).

The straight grid line connecting the first lattice points in the main scanning direction is a straight grid line Lrx. The straight grid line connecting the first lattice points in the sub-scanning direction is a straight grid line Lrgy.

The second lattice points are disposed on a rectangular lattice with a second lattice point pitch $d2x$ (first pitch) which is a pitch in the main scanning direction and a second lattice point pitch $d2y$ (second pitch) which is a pitch in the sub-scanning direction.

The straight grid line connecting the second lattice points in the main scanning direction is a straight grid line Lgbx. Each straight grid line Lgbx is a straight line that is each straight grid line Lrx is moved in parallel downward in the drawing by interval $d0y$ between lattices in the y direction (here, $d0y<d1y$).

The straight grid line connecting the second lattice points in the sub-scanning direction is the above described straight grid line Lrgy.

In the present embodiment, a case where $d1x=d2x$, $d1y=d2y$, and $d0y=d1y/2$ is an exemplary example.

The third lattice points are disposed on a rectangular lattice with a third lattice point pitch $d3x$ which is a pitch in the main scanning direction and a third lattice point pitch $d3y$ which is a pitch in the sub-scanning direction.

In the present embodiment, a case where $d3x=d2x$ and $d3y=d2y$ is an exemplary example. In addition, the third lattice points are formed at positions in which the second lattice points are moved in parallel rightward in the drawing by interval $d0x$ between lattices in the x direction.

In the case of the present embodiment, the straight grid line connecting the third lattice points in the main scanning direction is the above described straight grid line Lgbx.

The straight grid line connecting the third lattice points in the sub-scanning direction is a straight grid line Lby. Each the straight grid line Lby is a straight line that is each straight grid line Lrgy is moved in parallel rightward in the drawing by interval $d0x$ between lattices in the x direction (here, $d0x<d1x$). In the present embodiment, a case of $d0x=d1x/2$ is an exemplary example.

The first colored layer 3R is formed on the first lattice point. A position of the first colored layer center $C_R$ may not be coincident with the position of the first lattice point.

First colored layer centers $C_R$ are substantially aligned on the straight grid line Lrx (including a case of being aligned).

Since a movement error of the ink jet head and a position detecting error during manufacturing are unavoidable, the first colored layer center $C_R$ may deviate from the straight grid line Lrx. The movement error of the ink jet head and the position detecting error during manufacturing are noise components randomly generated in the sub-scanning direction and the main scanning direction to the same extent. Hereinafter, the positional deviation due to the movement error of the ink jet head and the position detecting error during manufacturing is particularly referred to as a random error.

The amount of deviation from the straight grid line Lrx in the sub-scanning direction due to the random error is, for example, less than ±0.5 µm. The amount of deviation in the sub-scanning direction is smaller than the amount of deviation in the main scanning direction which will be described later. Therefore, unless otherwise noted, the amount of deviation in the sub-scanning direction is ignored in the following description.

That is, the description will be made in which the first colored layers 3R are aligned on the straight grid line Lrx. Each assembly of the first colored layers 3R aligned on the straight grid line Lrx is referred to as a row of the first colored layers 3R.

On the other hand, a position of each first colored layer center $C_R$ in the main scanning direction changes periodically in a position close to the straight grid line Lrgy in the sub-scanning direction at a whole row. The change is greater than the change due to the above-described random error in the main scanning direction. Therefore, unless otherwise noted, the positional deviation in the main scanning direction due to the random error is ignored.

Hereinafter, each assembly of the first colored layers 3R arranged in a position close to each of the straight grid line Lrgy in the sub-scanning direction is referred to as a column of the first colored layers 3R.

Change patterns of first colored layer centers $C_R$ in each column of the first colored layer 3R are the same with each other.

Details of the change pattern will be described below.

In each row of the first colored layers 3R, adjacent pitches of the first colored layer centers $C_R$ vary from the first lattice point pitch d1x as the center. It is because that the pitch error is generated by the manufacture error of the ink jet nozzles of the ink jet head that forms the first colored layer 3R.

As will be described below, in the present embodiment, each row of the first colored layers 3R is formed by the same ink jet head. Accordingly, a pitch between centers of adjacent columns of the first colored layers 3R is uniform in the sub-scanning direction.

The second colored layer 3G is formed on the second lattice point. A position of the second colored layer center $C_c$ may not be coincident with the second lattice point.

The second colored layer centers $C_G$ are substantially aligned on the straight grid line Lgbx in the main scanning direction (including a case of being aligned).

Since there is the random error as in the first colored layer center $C_R$, the second colored layer center $C_G$ is deviated in the sub-scanning direction with respect to the straight grid line Lgbx. The amount of deviation of the second colored layer center $C_G$ from the straight grid line Lgbx in the sub-scanning direction due to the random error is the same as the amount of deviation of the first colored layer center $C_R$ with respect to the straight grid line Lrx. In the following, unless otherwise noted, the deviation amount due to the random error is ignored as in the case of the first colored layer 3R.

Hereinafter, each assembly of the second colored layers 3G arranged on the straight grid line Lgbx is referred to as a row of the second colored layer 3G.

On the other hand, the position of each second colored layer center $C_G$ in the main scanning direction is changed periodically at the whole row at a position close to the straight grid line Lrgy in the sub-scanning direction. The change is greater than the change in the main scanning direction due to the random error, as in the change of the first colored layer center $C_R$. Therefore, unless otherwise noted, the positional deviation in the main scanning direction due to the random error is ignored as in a case of the first colored layer 3R.

Hereinafter, each assembly of the second colored layer 3G arranged near the straight grid line Lrgy in the sub-scanning direction is referred to as a column of the second colored layer 3G.

The change patterns of the second colored layer center $C_G$ in each column of the second colored layer 3G are the same with each other.

Details of the change pattern will be described below.

The third colored layer 3B is formed on the third lattice point. A position of the third colored layer center $C_B$ may not be coincident with the third lattice point.

The third colored layer centers $C_B$ are substantially aligned on the straight grid line Lgbx (including a case of being aligned).

Since there is the random error as in the first colored layer center $C_R$, the third colored layer center $C_B$ is deviated in the sub-scanning direction with respect to the straight grid line Lgbx. The amount of deviation of the third colored layer center $C_B$ from the straight grid line Lgbx in the sub-scanning direction due to the random error is the same as the amount of deviation of the first colored layer center $C_R$ with respect to the straight grid line Lrx. In the following, unless otherwise noted, the deviation amount due to the random error is ignored as in the case of the first colored layer 3R.

Hereinafter, each assembly of the third colored layer 3B aligned on the straight grid line Lgbx is referred to as a row of the third colored layer 3B.

On the other hand, the position of each third colored layer center $C_B$ in the main scanning direction is changed periodically at the whole row at a position close to the straight grid line Lby in the sub-scanning direction. The change is greater than the change due to the random error in the main scanning direction, as in the change of the first colored layer center $C_R$. Therefore, unless otherwise noted, the positional deviation in the main scanning direction due to the random error is ignored as in a case of the first colored layer 3R.

Hereinafter, each assembly of the third colored layer 3B arranged on the position close to the straight grid line Lby in the sub-scanning direction is referred to as a column of the third colored layer 3B.

The change patterns of the third colored layer center $C_B$ in each column of the third colored layer 3B are the same as each other.

Details of the change pattern will be described below.

A shape or a size of the first colored layer 3R, the second colored layer 3G, and the third colored layer 3B can be determined in accordance with the shape or the size of the corresponding subpixel in the display (not shown).

The shape or the size of the first colored layer 3R, the second colored layer 3G, and the third colored layer 3B may be different from each other.

In the present embodiment, all the first colored layer 3R, the second colored layer 3G, and the third colored layer 3B have an approximately rectangular shape in which a width in the main scanning direction is Wx and a width in the sub-scanning direction is Wy. It is noted that the relation of Wx<d0x and Wy<d0y is satisfied.

The number of each of the first colored layers 3R, the second colored layers 3G, and the third colored layers 3B is I in the main scanning direction (here, I is an integer of 2 or greater) and J in the sub-scanning direction (here, J is an integer of 2 or greater).

In FIG. 2, a rectangular shaped region, that circumscribes the first colored layer 3R, the second colored layer 3G adjacent to the first colored layer 3R on the lowerside in the drawing, and the third colored layer 3B adjacent to the second colored layer 3G on the rightside in the drawing, configures a filter pixel portion P corresponding to a pixel of a display (not shown).

In color filter 1, the filter pixel portions P, the number of which is I in the main scanning direction and J in the sub-scanning direction, are disposed in a rectangular grid pattern.

In the filter pixel portion P, a y-direction intra-pixel gap Gy (=d0y-Wy) is formed between the first colored layer 3R and the second colored layer 3G.

In the filter pixel portion P, an x-direction intra-pixel gap Gx (=d0x-Wx) is formed between the second colored layer 3G and the third colored layer 3B.

Between the filter pixel portions P adjacent to each other, an x-direction inter-pixel gap GPx is formed in the main scanning direction and a y-direction inter-pixel gap GPy is formed in the sub-scanning direction.

In the present embodiment, a case of GPy=Gy and GPx=Gx is an exemplary example.

In the color filter 1, any of the colored layer and the BM is not present in regions of the y-direction intra-pixel gap Gy, the x-direction intra-pixel gap Gx, the y-direction inter-pixel gap GPy, and the x-direction inter-pixel gap GPx. In the regions of the y-direction intra-pixel gap Gy, the x-direction intra-pixel gap Gx, the y-direction inter-pixel gap GPy, and the x-direction inter-pixel gap GPx, incident light to the color filter 1 and the reflected light from the display (not shown) are transmitted through the image receiving layer 4 and the substrate 2 which have a light transmission property.

In the filter pixel portions P adjacent to each other, any of the colored layer and the BM is not formed in a region between the first colored layers 3R adjacent to each other in the main scanning direction and a region between the third colored layers 3B adjacent to each other in the sub-scanning direction. The regions are disposed to face the subpixel for white of the display (not shown). In regions between the first colored layers 3R and between third colored layers 3B, incident light to the color filter 1 and the reflected light from the subpixel for white of the display (not shown) are transmitted through the image receiving layer 4 and the substrate 2 which have a light transmission property.

The size (nominal value) of each of the colored layer and the filter pixel portion P can be appropriately set.

For example, in a case where all pitches (d1x, d2x, and d3x) of the first to third lattice points in the main scanning direction are dx, and all pitches (d1y, d2y, and d3y) of the first to third lattice points in the sub-scanning direction are dy, dx and dy may be selected from a range of 40 µm to 1000 µm.

In a case where length of the filter pixel portion P in the x direction is denoted by Dx, the Dx may be, for example, in a range of 0.7×dx to 0.95×dx. In a case where the length of the filter pixel portion P in the y direction is denoted by Dy, Dy may be, for example, in a range of 0.7×dy to 0.95×dy.

In present embodiment, the relations of GPx=Gx=dx−Dx and GPy=Gy=dy−Dy are satisfied.

Next, a detailed configuration of the filter pixel portion P will be described.

FIG. 4 schematically shows the filter pixel portions P at mth (here, m is an integer of 1≤m≤I−3) to m+3th positions in the main scanning direction and nth (here, n is an integer of 1≤n≤J−3) to n+3th positions in the sub-scanning direction.

In FIG. 4, for example, filter pixel portion $P_{i,j}$ (i=m, m+1, m+2, m+3 and j=n, n+1, n+2, n+3) represents the filter pixel portion P at ith position in the main scanning direction and jth position in the sub-scanning direction.

In FIG. 4, in order to easily view the difference in positions of the first colored layer 3R, the second colored layer 3G, and the third colored layer 3B, a space between the colored layers is magnified.

In FIG. 4, reference signs representing the filter pixel portion and the like may be appropriately omitted in some portions. In addition, even in the filter pixel portion to which the reference signs are not attached in FIG. 4, the filter pixel portion may be referred to as the filter pixel portion P in Description.

As shown in FIG. 1, filter pixel portion $P_{1,1}$ is positioned on the upper left side in the drawing, that is a reference position of the main scanning direction and the sub-scanning direction. The filter pixel portion $P_{i,j}$ moves to the right side in the drawing in the main scanning direction as the i increases. The filter pixel portion $P_{i,j}$ moves to the lowerside in the drawing in the sub-scanning direction as the j increases.

An assembly of the filter pixel portions $P_{k,j}$ (here, j is an integer of 1≤j≤J) in which i is fixed to k (here, k is an integer of 1≤k≤I) is referred to as a kth row of the filter pixel portions P.

An assembly of the filter pixel portions $P_{i,k}$ (here, i is an integer of 1≤i≤I) in which j is fixed to k (here, k is an integer of 1≤k≤J) is referred to as a kth column of the filter pixel portions P.

A straight grid line $LX_k$ (here, k is an integer of 1≤k≤I) is a center axis line that divides a space between the straight grid lines Lrx and Lgbx at kth row of the filter pixel portions P into two spaces in the sub-scanning direction.

A straight grid line $LY_k$ (here, k is an integer of 1≤k≤J) is a center axis line that divides a space between the straight grid lines Lrgy and Lby at kth column of the filter pixel portions P into two spaces in the main scanning direction.

In FIG. 4, as shown in an example of a case of i=m, m+1, m+2, m+3 and j=n, n+1, n+2, n+3, the filter pixel portion $P_{i,j}$ is formed on the lattice point (pixel portion lattice point) at a position in which the straight grid lines $LX_i$ and $LY_j$ of the lattice pattern (pixel portion lattice pattern) intersect. A pixel portion center $CP_{i,j}$ that is the center of the filter pixel portion $P_{i,j}$ may not be coincident with a position of the lattice point.

Pitches dPx in the main scanning direction and dPy in the sub-scanning direction between lattice points at positions in which the straight grid lines LXi and LYj intersect have a relation of dPx=d1x and dPy=d1y.

Here, the pixel portion center $CP_{i,j}$ is defined by the center of a quadrangle that has sides parallel to the straight grid lines LXi and LYj and circumscribes the first colored layer 3R, the second colored layer 3G, and the third colored layer 3B of the filter pixel portion $CP_{i,j}$.

The pixel portion center $CP_{i,j}$ is not deviated with respect to the straight grid line LXi in the sub-scanning direction excluding the random error.

Such a disposition of the pixel portion center $CP_{i,j}$ is based on a disposition of above described the first colored layer 3R, the second colored layer 3G, and the third colored layer 3B.

As shown in FIG. 4, in each row of the filter pixel portions P, dispositions of the first colored layer 3R, the second colored layer 3G, and the third colored layer 3B are different from each other in general between filter pixel portions P adjacent to each other in the main scanning direction.

On the contrary, the dispositions of the first colored layer 3R, the second colored layer 3G, and the third colored layer 3B in each column of the filter pixel portions P are common in each column.

In the present embodiment, a positional deviation of the first colored layer center $C_R$, the second colored layer center $C_G$, and the third colored layer center $C_B$ in the main scanning direction is generated by a production error relating to the nozzle position of the ink jet head (not shown) and intended vibration of the ink jet head at the time of discharging the ink which will be describes later. The vibration of the ink jet head is periodic.

Hereinafter, the positional deviation in the main scanning direction due to the production error of the nozzle position is referred to as an inherent component of the positional deviation. The positional deviation in the main scanning direction due to the intended vibration of the ink jet head is referred to as a vibration component of the positional deviation.

The colored layer exemplified by a thin line in FIG. 4 is a colored layer not having the inherent component of the positional deviation. The colored layer exemplified by hatching in FIG. 4 is a colored layer having the inherent component of the positional deviation.

For example, in each column of the filter pixel portions P at n+1th and n+3th positions, all colored layers do not have the inherent component of the positional deviation. However, since each column has the vibration component of the positional deviation, center positions of the filter pixel portions P are changed periodically based on the vibration component of the positional deviation of each colored layer, in the sub-scanning direction.

In FIG. 4, a case of $\delta P_{i,n+1} = \delta P_{i,n+3}$ (here, i is an integer of $1 \leq i \leq I$) is an exemplary example. The $\delta P_{i,n+1}$ and $\delta P_{i,n+3}$ are formed of only the vibration component of the positional deviation as the filter pixel portion P.

On the contrary, in the nth column of filter pixel portions P, the second colored layer 3G and the third colored layer 3B have the inherent components of the positional deviation different from each other. Therefore, each center in the nth column of the filter pixel portions P has the inherent component of the positional deviation as the filter pixel portion P. The inherent component of the positional deviation as the filter pixel portion P is determined by the inherent component of the positional deviation of the second colored layer 3G and third colored layer 3B.

In nth column of the filter pixel portions P, the inherent component of the positional deviation as the filter pixel portion P is $\delta P_{i,n} - \delta P_{i,n+1}$. In an example shown in FIG. 4, nth column of the filter pixel portions P is deviated toward the left side in the drawing with respect to the straight grid line $LY_n$, on the whole.

In n+2th column of filter pixel portions P, the first colored layer 3R, the second colored layer 3G, and the third colored layer 3B have the inherent components of the positional deviation different from each other. Therefore, each center in the n+2th column of filter pixel portions P has the inherent component of the positional deviation as the filter pixel portion P.

The inherent component of the positional deviation as the filter pixel portion P is determined by the inherent components of the positional deviation of the first colored layer 3R, the second colored layer 3G, and the third colored layer 3B.

In the n+2th column of the filter pixel portions P, the inherent component of the positional deviation as the filter pixel portion P is $\delta P_{i,n+2} - \delta P_{i,n+1}$. In an example shown in FIG. 4, n+2th column of the filter pixel portions P is deviated toward the right side in the drawing with respect to the straight grid line $LY_{n+2}$, on the whole.

When a positional deviation amount from the lattice point of the filter pixel portion $P_{i,j}$ in the main scanning direction is defined as a pixel portion positional deviation amount $\delta P_{i,j}$, the inherent component of the positional deviation is denoted by $\delta P_0(i)$, and the vibration component of the positional deviation is denoted by $\delta Px(j)$, the following Equation (5) is satisfied.

The pixel portion positional deviation amount $\delta P_{i,j}$ does not exceed the maximum value of the positional deviation amount of the first colored layer 3R, the second colored layer 3G, and the third colored layer 3B in the main scanning direction in accordance with the above described definition of the pixel portion center $CP_{i,j}$.

$$\delta P_{i,j} = \delta P_0(i) + \delta Px(j) \qquad (5)$$

The pixel portion deviation amount $\delta P_{i,j}$ can be measured from each filter pixel portion P of the color filter 1. Since the vibration component $\delta Px(j)$ is vibrated periodically in the sub-scanning direction, an average value relating to j becomes zero. Accordingly, the inherent component $\delta P_0(i)$ is obtained by the following Equation (6).

$$\delta P_0(i) = \frac{1}{J}\sum_{j=1}^{J} \delta P_{i,j} \qquad (6)$$

The inherent component $\delta P_0(i)$ of the positional deviation of the filter pixel portion $P_{i,j}$ varies depending on i corresponding to the position of the filter pixel portion $P_{i,j}$ in the main scanning direction.

In the present embodiment, as will be described below, relative positions of the ink jet heads each forming the first colored layer 3R, the second colored layer 3G, and the third colored layer 3B are fixed to each other. Therefore, if the combination of ink jet heads is determined, the inherent component $\delta P_0(i)$ is determined consistently thereto.

FIG. 5 shows an example of the pixel portion positional deviation amount $\delta P_{i,j}$ in the color filter 1. The pixel portion positional deviation amount $\delta P_{i,j}$ varies depending on j corresponding to a position of the filter pixel portion $P_{i,j}$ in the main scanning direction, and varies around zero on the whole.

In the present embodiment, as an example, the colored layer is formed by dividing the main scanning direction into three regions by using an ink jet head in which the number of the nozzles is J/3. Therefore, in regions B1 B2, and B3 which are divided into three regions in the main scanning direction, the change in pixel portion positional deviation amount $\delta P_{i,j}$ are the same.

The maximum value of the pixel portion positional deviation amount $\delta P_{i,j}$ is denoted by $\delta Pmax(i)$. The minimum value of the pixel portion positional deviation amount $\delta P_{i,j}$ is denoted by $\delta Pmin(i)$.

A range EP(i) of the pixel portion positional deviation amount in ith row is defined by the following Equation (7).

$$EP(i) = \delta Pmax(i) - \delta P\min(i) \qquad (7)$$

The range EP(i) results from the production error of the ink jet head. Therefore, the range EP(i) is should match with a head error range $EP_H$.

The head error range $EP_H$ is defined as a range of the deviation amount from the designed position of the ink jet nozzles. A detailed definition of the head error range $EP_H$ will be provided later.

However, since the pixel portion positional deviation amount $\delta P_{i,j}$ varies by being affected by the random error in the main scanning direction, an average range $EP_{ave}$ obtained by averaging the range EP(i) with respect to i is used as a good estimation value of the head error range $EP_H$.

The average range $EP_{ave}$ is defined by the following Equation (8).

$$EP_{ave} = \frac{1}{I}\sum_{i=1}^{I} EP(i) \quad (8)$$

In the color filter 1, the average range $EP_{ave}$ is 1 μm to 10 μm.

When the average range $EP_{ave}$ is less than 1 μm, even the position of the filter pixel portion P is not changed periodically, it is difficult to see the density unevenness in the main scanning direction due to the pitch error of the filter pixel portion P.

When the average range $EP_{ave}$ is greater than 10 μm, as will be described later, it is required to increase the vibration component of the positional deviation of the filter pixel portion P. Therefore, the image quality of the display is deteriorated depending on the size of the filter pixel portion P.

When excluding the random error, the vibration component δPx(j) is represented by the following Equations (9) to (11).

$$\delta Px(j) = \Delta X \sin\left(\frac{2\pi}{p} \cdot y + \alpha\right) \quad (9)$$

$$y = y_1 + dPy \cdot (j-1) \quad (10)$$

$$0.5 \cdot \frac{EP_{ave}}{2} \leq \Delta X \leq 1.5 \cdot \frac{EP_{ave}}{2} \quad (11)$$

Here, ΔX is a constant coefficient representing an amplitude. p is a wavelength of the vibration (1/p is a spatial frequency of vibration). $y_1$ is a position coordinate of the pixel portion center $CP_{i,1}$ in the y direction. α is a constant that represents an initial phase of the vibration component.

The wavelength p is appropriately set according to the size of the filter pixel portion P and the like such that it is difficult to see stripe shaped unevenness which will be described later. For example, the wavelength p may be selected from a range of 1 mm to 50 mm.

It can be statistically confirmed that the vibration component δPx(j) in the color filter 1 satisfies above Equations (9), (10), and (11). Specifically, the vibration components δPx(j) in each row may be measured, and a statistical analysis such as a regression analysis may be performed.

Next, a method of manufacturing the color filter 1 will be described.

Figure 6:
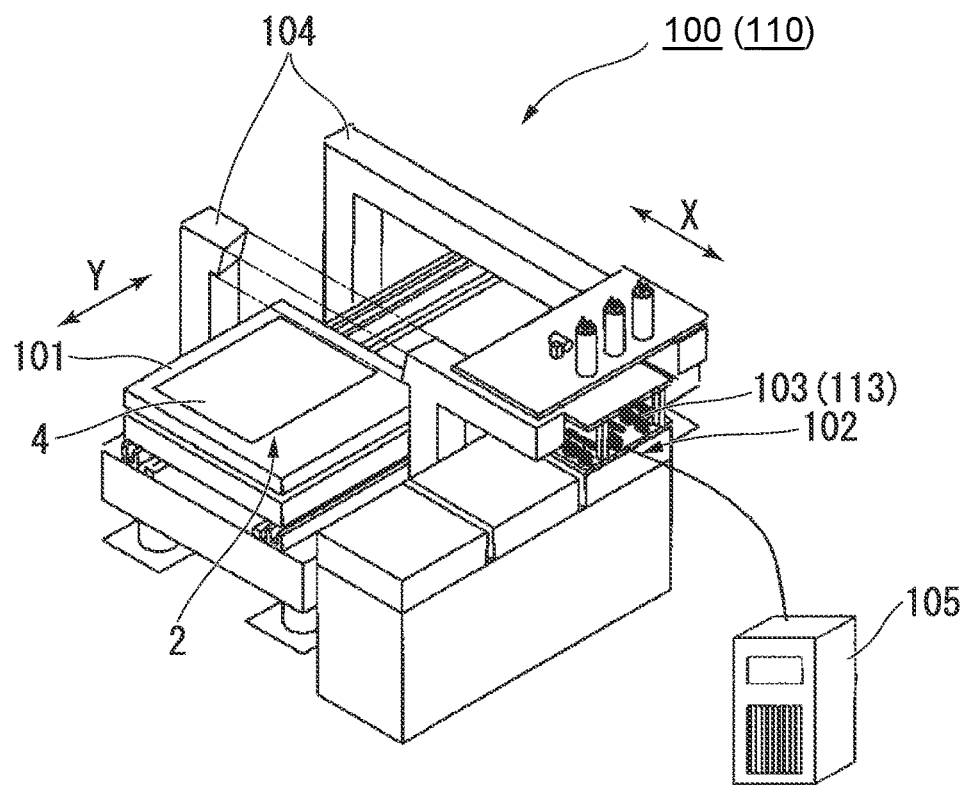
FIG. 6 is a schematic perspective view showing a configuration example of an ink jet device used to a method of manufacturing the color filter according to the first embodiment of the present invention.
Figure 7:
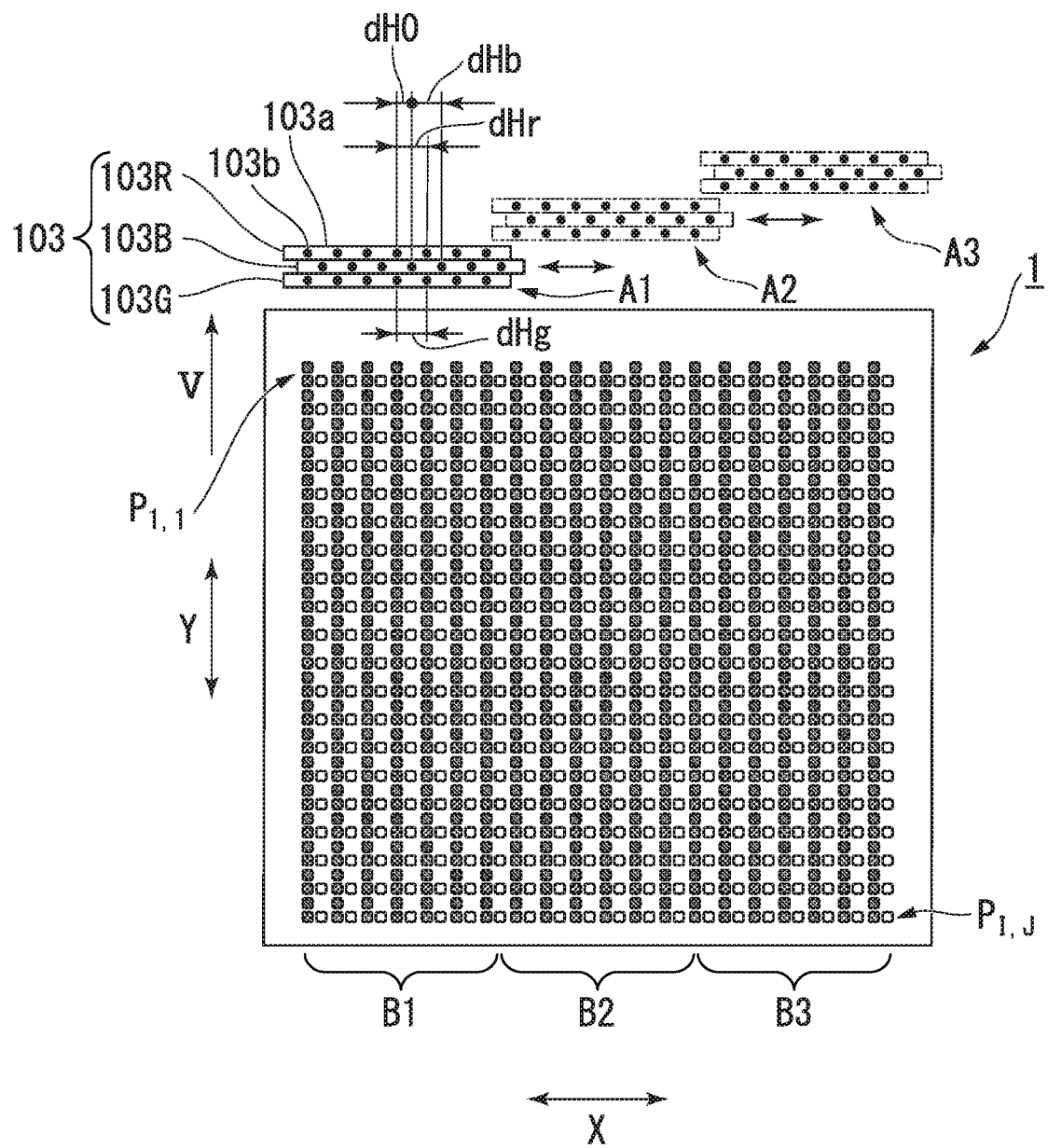
FIG. 7 is an explanatory view showing an operation of the method of manufacturing the color filter according to the first embodiment of the present invention.
Figure 8:
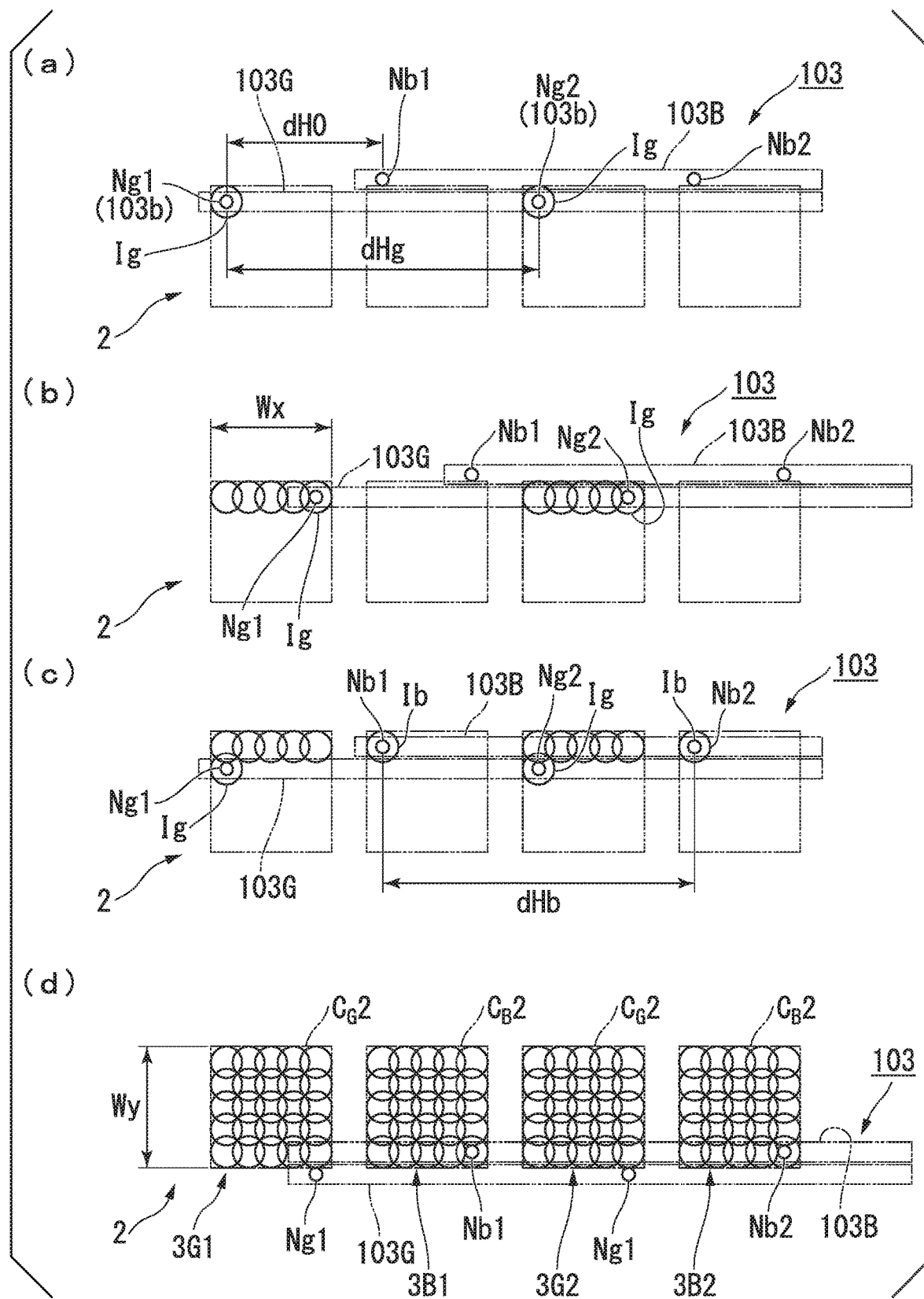
FIG. 8 is an explanatory view showing an operation of the method of manufacturing the color filter according to the first embodiment of the present invention.

FIG. 6 is a schematic perspective view showing a configuration example of an ink jet device used to a method of manufacturing the color filter according to the first embodiment of the present invention. FIG. 7 is an explanatory view showing an operation of the method of manufacturing the color filter according to the first embodiment of the present invention. Part (a) of FIG. 8, part (b) of FIG. 8, part (c) of FIG. 8, and part (d) of FIG. 8 shows an explanatory view showing an operation of the method of manufacturing the color filter according to the first embodiment of the present invention.

FIG. 6 shows an example of an ink jet device 100 for manufacturing the color filter 1.

The ink jet device 100 includes a moving table 101, an ink jet head unit 102, a moving stage 104, and a controller 105.

The moving table 101 is provided to be movable in Y direction in the drawing. It is possible that the substrate 2 is positioned and mounted on a top surface of the moving table 101. The image receiving layer 4 is formed on the surface of the substrate 2 in advance. The substrate 2 is mounted on the moving table 101 such that the image receiving layer 4 appears on the top surface.

The y direction of the positioned substrate 2 coincides with the Y direction that is a moving direction of the moving table 101.

The ink jet head unit 102 includes an ink jet head portion 103 (ink jet head) and an ink supply portion (not shown).

As schematically shown in FIG. 7, the ink jet head portion 103 includes an ink jet head 103R (sub-head) forming the first colored layer 3R, an ink jet head 103G (sub-head) forming the second colored layer 3G, and ink jet head 103B (sub-head) forming the third colored layer 3B.

Each of the ink jet heads 103R, 103G, and 103B includes a body portion 103a in which the ink is accommodated and nozzle portion 103b (ink jet nozzle) disposed on an end surface of the body portion 103a. Respective body portions 103a are disposed to be adjacent to each other in a short-length direction of the body portions, and relative positions are fixed to each other.

The body portions 103a of the ink jet heads 103R, 103G, and 103B respectively accommodate inks forming the first colored layer 3R, the second colored layer 3G, and the third colored layer 3B.

Each of the ink jet heads 103R, 103G, and 103B includes a plurality of nozzle portions 103b. The nozzle portions 103b are arranged in a longitudinal direction of each of the body portion 103a. An arrangement direction of ink discharge ports of nozzle portions 103b is referred to as the main scanning direction in the ink jet head portion 103.

The nozzle pitch between nozzle portions 103b of the ink jet head 103R is denoted by dHr representing a length corresponding to the first lattice point pitch d1x.

The nozzle pitch between nozzle portions 103b of the ink jet head 103G is denoted by dHg representing a length corresponding to the second lattice point pitch d2x. The nozzle pitch of nozzle portions 103b of the ink jet head 103G is deviated in the main scanning direction with respect to the nozzle portion 103b of the ink jet head 103R by dH0 representing a length corresponding to the interval d0x between lattices in the x direction.

The nozzle pitch between nozzle portions 103b of the ink jet head 103B is denoted by dHb representing a length corresponding to the third lattice point pitch d3x. In the present embodiment, dHb is equal to dHr. The nozzle portions 103b of each of ink jet heads 103B and 103R face to each other in a direction in which the ink jet nozzles orthogonal to the main scanning direction.

In the ink jet head portion 103, positions of ink jet nozzles vary due to the production error inherent thereto. Accordingly, values of the nozzle pitches dHr, dHg, and dHb are deviated from the nominal value depending on the position in the main scanning direction.

In the ink jet heads 103R, 103G, and 103B, when the respective deviation amounts of the nozzle portion 103b from the designed formation position are denoted by $\delta N_k$ (here, k=1, 2, 3), $EN_k$ which is obtained by subtracting the minimum value from the maximum value in each $\delta N_k$ is in the head error range $E_{kH}$ for each of the ink jet heads 103R, 103G, and 103B. The head error range $E_{kH}$ varies depending on k, in general.

In the present embodiment, in a state where relative positions of the ink jet heads 103R, 103G, and 103B are fixed to each other, three adjacent nozzle portions 103b form the filter pixel portion P as will be described later. Therefore, the positional deviation amount of the nozzle portion 103b contributing to the positional deviation of the filter pixel portion P is determined by the relative position of the ink discharge ports of the three nozzle portions 103b corresponding to the filter pixel portion P.

When, the positional deviation amount, of the ink discharge ports of the three nozzle portions 103b constituting one filter pixel portion P, in the main scanning direction is denoted by $\delta NP_k(s)$ (here, s is an integer satisfying $1 \leq s \leq S_k$ and $S_k$ in the number of nozzles of the ink jet unit), the nozzle positional deviation SNP(s) of the pixel portion unit contributing to the positional deviation of the filter pixel portion P in the main scanning direction is represented by the following Equation (12). When forming the filter pixel portion $P_{i,j}$, a positive direction of $\delta NP(s)$ is set as a direction toward a greater j side from a small j side (left to right direction in the drawing in FIG. 7).

$$\delta NP(s) = \frac{1}{2}\{\text{Min}[\delta NP_k(s)]_{1,2} + \delta NP_3(s)\} \tag{12}$$

Here, $\text{Min}[\ ]_{1,2}$ represents a calculation for obtaining a smaller one (on the left side in the drawing) between $\delta NP_1(s)$ and $\delta NP_2(s)$.

Equation (12) is based on the filter pixel portion P defined by a quadrangle that circumscribes the first colored layer 3R, the second colored layer 3G, and the third colored layer 3B. In a case where the definition of the filter pixel portion P is different, a calculation method of the nozzle positional deviation $\delta NP(s)$ of the pixel portion unit may change in accordance with the definition.

The head error range $EP_H$ is defined as a range of the nozzle positional deviation $\delta NP(s)$. That is, when the maximum value of the nozzle positional deviation $\delta NP(s)$ is denoted by $\delta NP\text{max}$ and the minimum value is denoted by $\delta NP\text{min}$, the head error range $EP_H$ is defined by the following Equation (13).

$$EP_H = \delta NP\text{max} - \delta NP\text{min} \tag{13}$$

On upper side of the moving table 101, the moving stage 104 supports the ink jet head unit 102 to be movable. A moving direction of the ink jet head unit 102 by the moving stage 104 is the X direction orthogonal to the Y direction on the plan face parallel to the upper surface of the moving table 101.

The ink jet head portion 103 in the ink jet head unit 102 is disposed such that the main scanning direction coincides with the X direction.

The controller 105 is a device part controlling an operation of the ink jet device 100.

For example, the controller 105 controls a position of the moving table 101 in the Y direction and a position of the moving stage 104 in the X direction, thereby moving the ink jet head portion 103 relative to the substrate 2 on the moving table 101.

The controller 105 controls an ink discharging operation of the ink jet head portion 103 according to the relative movement position of the ink jet head portion 103.

Details of control of the controller 105 will be described later in operation description.

Next, an operation of the ink jet device 100 will be described by focusing on the method of manufacturing the color filter 1 performed by the ink jet device 100.

For manufacturing the color filter 1 by the ink jet device 100, first, the substrate 2 is positioned and mounted on the moving table 101 (refer to FIG. 6).

Next, the controller 105 moves the ink jet head portion 103 to a first position A1 by driving the moving stage 104, as shown by a solid line in FIG. 7.

Next, the controller 105 moves the substrate 2 in the Y direction at constant speed V by driving the moving table 101 (first operation). In parallel with this, the controller 105 causes the moving stage 104 to vibrate in the X direction, thereby causing the entire ink jet head portion 103 to vibrate in the X direction.

The vibration of the ink jet head portion 103 is a vibration in which a short period vibration and a long period vibration are combined.

The short period vibration is a vibration for performing two-dimensional scanning by discharging the ink in order to form the first colored layer 3R, the second colored layer 3G, and the third colored layer 3B. The wavelength of the short period vibration is shorter than the width of each colored layer in the sub-scanning direction.

The long period vibration is a vibration changing the vibration component $\delta Px(j)$ of the positional deviation of the filter pixel portion $P_{i,j}$ according to above described Equations (9) to (11) (fourth operation).

The long period vibration performed by the moving stage 104 is represented by the following Equations (14) and (15) using a displacement of the ink jet head portion 103 in the X direction as x.

$$x = \Delta X \sin\left(\frac{2\pi}{p} \cdot y + \beta\right) \tag{14}$$

$$y = V \cdot t \tag{15}$$

$$0.5 \cdot \frac{EP_H}{2} \leq \Delta X \leq 1.5 \cdot \frac{EP_H}{2} \tag{16}$$

Here, t represents time. The amplitude $\Delta X$ is a constant selected from the range of Equation (16). The head error range $EP_H$ in Equation (16) can be obtained by detecting a nozzle position of nozzle portion 103b of the ink jet head portion 103. The head error range $EP_H$ may be obtained by performing ink discharging from the ink jet head portion 103 to detect a position of the discharged ink.

The wavelength p is a constant the same as that of Equation (9). 0 is a constant that represents an initial phase.

The wavelength p of the long period vibration is longer than the width of each colored layer in the sub-scanning direction.

Frequency f of the long period vibration is represented by f=V/p.

The controller 105 controls the ink jet head unit 102 such that the ink is discharged at the timing when each of the ink jet nozzles of the ink jet head portion 103 reaches a predetermined position.

Accordingly, the ink jet head portion 103 sequentially forms the first colored layers 3R, the second colored layers 3G, and the third colored layers 3B, the number of the colored layers respectively being J/3 (J/3 is the number of the ink jet nozzles).

When rows of the colored layers are formed until the number of row is to be I, the controller 105 finish the ink discharging. Accordingly, I×J/3 filter pixel portions P are formed on the region B1.

Next, the controller 105 moves the ink jet head portion 103 to a second position A2, and repeats the above operations. The second position A2 is a position moved from the first position A1 to the right side in the drawing in the X direction by a distance of dPx×J/3.

Accordingly, I×J/3 filter pixel portions P are formed on the region B2.

Next, the controller 105 moves the ink jet head portion 103 to a third position A3, and repeats the above operations. The third position A3 is a position moved from the second position A2 to the right side in the drawing in the X direction by a distance of dPx×J/3.

Accordingly, I×J/3 filter pixel portions P are formed on the region B3.

In this way, the color filter 1 that includes I×J filter pixel portions P on the substrate 2 is manufactured.

Next, an example of an operation for forming the first colored layer 3R, the second colored layer 3G, and the third colored layer 3B will be described in detail.

Since the operation for forming each colored layer are the same with each other, the operation for forming the second colored layer 3G and third colored layer 3B is described as an example by using part (a) of FIG. 8, part (b) of FIG. 8, part (c) of FIG. 8, and part (d) of FIG. 8.

In the following description, for example, the second colored layer 3G and third colored layer 3B are formed by drawing five lines, formed of five drops of ink in the main scanning direction (X direction), in the sub-scanning direction so as to have rectangular shape. However, since the line also moves in the sub-scanning direction during when the line is formed in the main scanning direction, a main scanning line is slightly lowered to the right in the drawing.

As shown in part (a) of FIG. 8, the substrate 2 reaches a position on which the third colored layer 3B of the filter pixel portion P in the first row is formed. Then, the controller 105 causes each nozzle portion 103 *b* to start the ink discharging at the timing when the ink jet head portion 103 is positioned on the leftmost side in the drawing, in the short period vibration of the ink jet head portion 103.

For example, one drop of ink Ig is discharged from each of the discharge ports Ng1 and Ng2 (shown in the drawing). The discharged ink Ig impacts on the substrate 2 below the discharge ports Ng1 and Ng2.

Since the pitch between the discharge ports Ng1 and Ng2 is dHg, the pitch between the inks Ig is also dHg.

As shown in part (b) of FIG. 8, the controller 105 causing each nozzle portions 103*b* to discharge the five drops of ink Ig during a half period of the short period vibration of the ink jet head portion 103. Accordingly, one main scanning line that constitutes approximately one-fifth of the second colored layer 3G is formed. When one main scanning line is formed, the controller 105 pauses the ink discharging.

The moving speed V of the substrate 2 is set to a speed of moving by the same distance as a line width of the main scanning line during the half period of the short period vibration.

The controller 105 causes the ink discharging to be started after the half period of the short period vibration has elapsed from the state of part (b) of FIG. 8.

Accordingly, as shown in part (c) of FIG. 8, a formation of a second main scanning line is started at position adjacent to the first main scanning line. When five main scanning lines are formed by repeating the operations, by each nozzle portion 103*b* of the ink jet head 103G, J/3 second colored layers 3G for one row are formed (second operation).

Similarly, the third colored layers 3B are formed on a position, on which the third colored layer 3B is formed, by each nozzle portion 103*b* of the ink jet head 103B.

For example, as shown in part (c) of FIG. 8, when the formation of the second main scanning line of the second colored layers 3G is started, the discharge ports Nb1 and Nb2 of the ink jet head 103G just reach a position at which the formation of the first main scanning line of the third colored layers 3B. Therefore, ink jet head 103B starts the formation of the main scanning line of third colored layers 3B, with delaying for one line.

As in the ink jet head 103G, when main scanning lines for five lines are formed also from the ink jet head 103B, J/3 third colored layers 3B for one row are formed (second operation).

Since the ink jet heads 103G and 103B can perform the ink discharging at each independent timing, a timing gap in the ink discharging is not limited to one line delay.

In this way, as shown in part (d) of FIG. 8, over some time, J/3 second colored layers 3G and the second colored layers 3G for one row are formed. After J/3 second colored layers 3G and the second colored layers 3G for one row are formed, the controller 105 stops the ink discharging.

During the operation, the controller 105 causes the ink jet head portion 103 to vibrate for a long period. Therefore, starting position of the main scanning line of each of the colored layers is changed by an amount corresponding to the long period vibration. Since these change amounts are minute, the change amount is not shown in part (a) of FIG. 8, part (b) of FIG. 8, part (c) of FIG. 8, and part (d) of FIG. 8.

After the time elapses from starting the ink discharging by $\Delta t = d2y/V$, as in the case above, the second colored layers 3G and third colored layers 3B for the second row are formed (third operation).

Above operations are repeated I times along with the same operation for forming the first colored layer 3R (not described), thereby forming I×J/3 filter pixel portions P.

Next, an action of the color filter 1 will be described.

Figure 9:
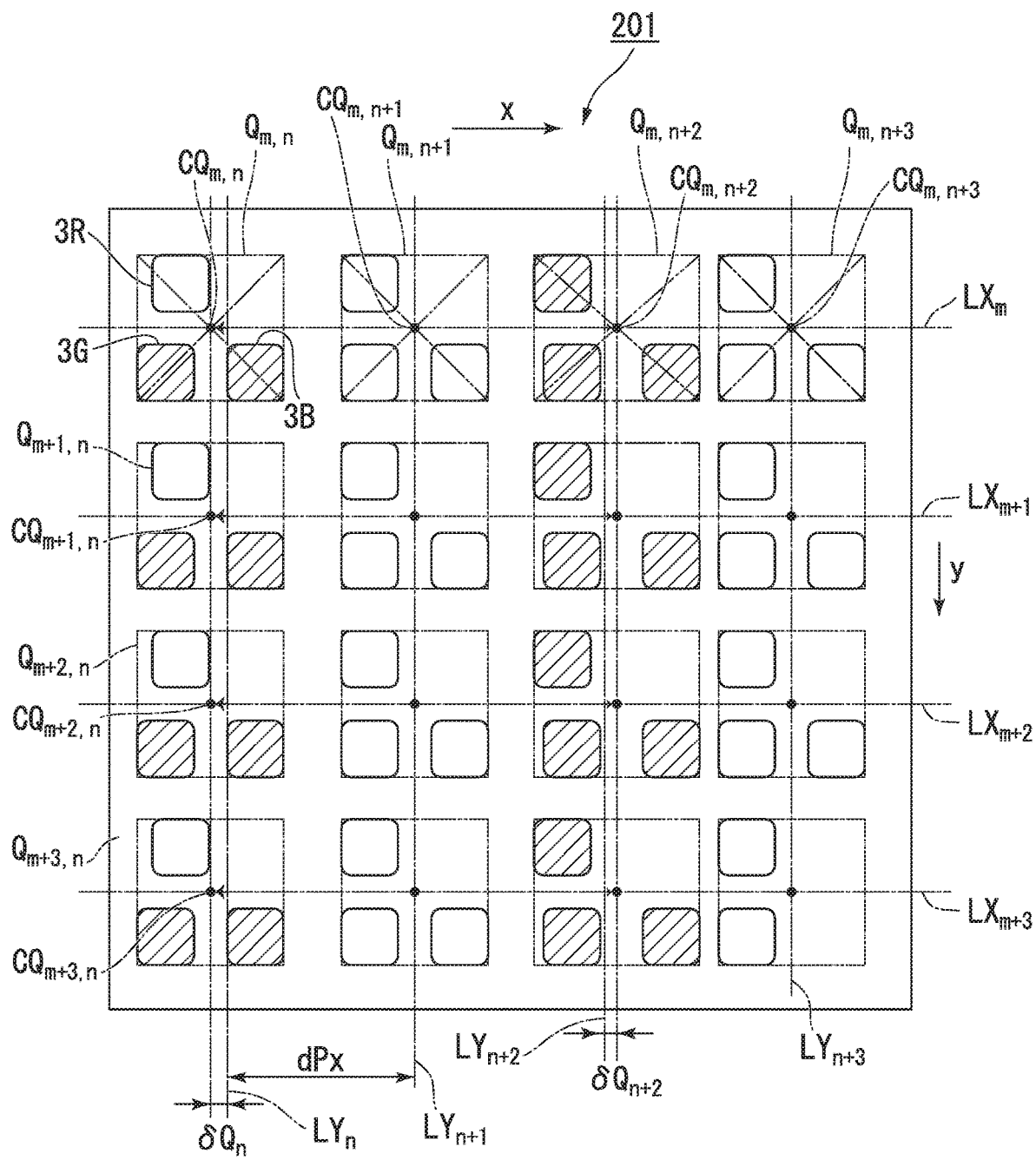
FIG. 9 is a schematic view showing a disposition example of colored layers in a color filter according to a comparative example.

FIG. 9 is a schematic view showing a disposition example of the colored layers in a color filter according to a comparative example.

In the color filter 1 manufactured by using the ink jet head portion 103, the pitches of the first colored layers 3R, the second colored layers 3G, and the third colored layers 3B in the main scanning direction are respectively equal to the nozzle pitches dHr, dHg, and dHb between the nozzle portions 103*b* in the ink jet head portion 103.

Therefore, according to the nozzle pitches dHr, dHg, and dHb due to the production error of the ink jet head portion 103, the inherent component of the positional deviation of each of the first colored layer center $C_R$, the second colored layer center $C_G$, and the third colored layer center $C_B$ in the main scanning direction with respect to the lattice points on the substrate 2 is generated.

Since the relative positions of the ink jet heads 103R, 103G, and 103B are fixed to each other, the inherent component of the positional deviation of the filter pixel portion P in the main scanning direction is generated by combining the inherent components of the positional deviation of the respective colored layer in the main scanning direction.

In the color filter 1, when the positional deviation of each of the filter pixel portion P in the main scanning direction is only the inherent component, the inherent component of the positional deviation is a pitch error between respective columns of the filter pixel portions P.

The color filter 201 shown in FIG. 9 shows a comparative example in which the color filter is manufactured by the same manner as those of the first embodiment, excepting that the above-described long period vibration is not performed.

The filter pixel portion $Q_{i,j}$ in FIG. 9 corresponds to the filter pixel portion $P_{i,j}$ in FIG. 4.

In the present comparative example, since the ink jet head portion 103 is not vibrated for a long period, the vibration component of the positional deviation is zero. Therefore, the centers of the filter pixel portions Q are positioned on a line parallel to the straight grid line $LY_j$ in all columns.

For example, the pixel portion centers $CQ_{i,n+1}$ and $CQ_{i,n+3}$ in n+1th and n+3th columns of filter pixel portions Q in which the positional deviation amount of each colored layer is zero are respectively positioned on the straight grid lines $LY_{n+1}$ and $LY_{n+3}$.

The pixel portion center $CQ_{i,n}$ in nth column of the filter pixel portions Q in which positions of the second colored layer 3G and the third colored layer 3B are deviated, is deviated toward the left side in the drawing with respect to the straight grid line $LY_n$ by an amount of $\delta Q_n$ ($=\delta P_{m,n}$).

The pixel portion center $CQ_{i,n+2}$ in n+2th column of the filter pixel portions Q in which positions of all colored layers are deviated, is deviated toward the right side in the drawing with respect to the straight grid line $LY_{n+2}$ by an amount of $\delta Q_{n+2}$ ($=\delta P_{m,n+2}$).

The pitch between the nth column and the n+1th column and the pitch between the n+1th column and the n+2th column in the main scanning direction are wider than the pitch dPx of between the lattice points. Therefore, low concentration stripes in the sub-scanning direction are visually recognized. The pitch between the n+2th column and the n+3th column in the main scanning direction is narrower than the pitch dPx between the lattice points. Therefore, high concentration stripes in the sub-scanning direction are visually recognized.

Accordingly, in the color filter 201, the concentration irregularity in the main scanning direction occurs and the concentration irregularity is uniformly continuous in the sub-scanning direction. Therefore, the stripe shaped unevenness extending in the sub-scanning direction is visually recognized.

Therefore, since when the color filter 201 is used to the display, the stripe shaped unevenness appears irrelevant to a display image, the image quality is deteriorated.

The color filter 1 of the present embodiment includes the inherent component of the positional deviation as those of the comparative example, for each row of the filter pixel portions P. However, each row of the filter pixel portions P is deviated periodically in the main scanning direction by the long period vibration. Accordingly, the position of the concentration irregularity in each row in the main scanning direction changed for each row, and continuity of the concentration irregularity in the sub-scanning direction decreases.

Accordingly, comparing with the comparative example, it is difficult to see the stripe shaped unevenness extending in the sub-scanning direction.

In a case where $\Delta X$ is approximately the same with the head error range $EP_H$, it is most difficult to see the stripe shaped unevenness.

However, since watching the stripe shaped unevenness is different depending on the observer, a suitable size may be determined by a trial production or an experiment in which $\Delta X$ is variously changed. As examples to be described, when $\Delta X$ is selected from the range of above Equation (16), the stripe shaped unevenness can be eliminated.

As described above, according to the color filter 1 and method of manufacturing the same according to the present embodiment, the position of the center of the filter pixel portion P in the main scanning direction is changed periodically in the sub-scanning direction, in each column in which the filter pixel portions are arranged in the sub-scanning direction. Therefore, generation of the stripe shaped unevenness due to the non-uniformity of the nozzle pitch of the ink jet head portion 103 can be suppressed.

Here, in the present embodiment, correspondence with the term of claims will be described.

In the present embodiment, a case where the colored layer of the color filter are formed of the filter pixel portion P, that is the pixel portion in which the first colored layer 3R, the second colored layer 3G, and the third colored layer 3B as unit colored layers are assembled, is an exemplary example.

Therefore, the average range $EP_{ave}$ in above Equation (11) corresponds to the colored layer positional deviation range E in above Equation (1).

The vibration component $\delta P_X(j)$ in above Equation (9) corresponds to the displacement x in above Equation (2).

In the present embodiment, a case where the relative positions of three sub-nozzles forming the unit colored layer are fixed to each other is an exemplary example.

The head error range $EP_H$ in above Equation (16) corresponds to the head error range $E_H$ in above Equation (3).

Second Embodiment

A color filter according to a second embodiment of the present invention will be described.

Figure 10:
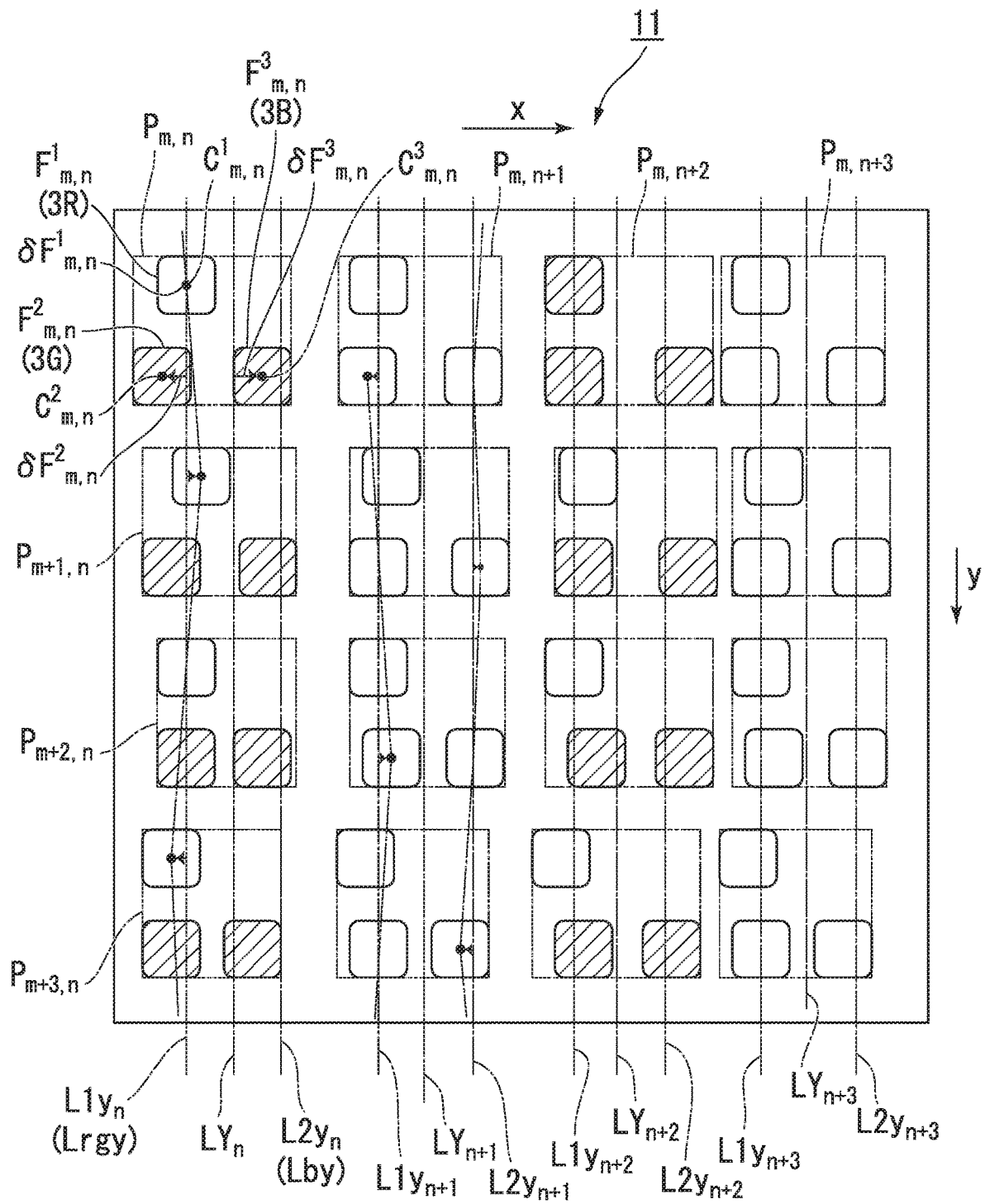
FIG. 10 is a schematic view showing a disposition example of colored layers in a color filter according to a second embodiment of the present invention.

FIG. 10 is a schematic view showing a disposition example of colored layers in a color filter according to the second embodiment of the present invention.

As shown in FIGS. 1 to 3, a color filter 11 of the present embodiment includes the substrate 2, the image receiving layer 4, the first colored layer 3R, the second colored layer 3G, and the third colored layer 3B, as the same with the color filter 1 of the first embodiment.

Also in the color filter 11, the first colored layer 3R, the second colored layer 3G, and the third colored layer 3B configure the filter pixel portion P.

However, the color filter 11 of the present embodiment is different from that of the first embodiment in that, the first colored layer 3R, the second colored layer 3G, and the third colored layer 3B respectively have independent vibration component of the positional deviation.

Hereinafter, description will be made by focusing on the different points from the first embodiment.

In FIG. 10, the filter pixel portion $P_{i,j}$ (i=m, m+1, m+2, m+3 and j=n, n+1, n+2, n+3) in the color filter 11 represents the filter pixel portion P at ith (in the main scanning direction) and jth (in the sub-scanning direction) position.

Since FIG. 10 is difficult to see, the reference sings are appropriately omitted similar to FIG. 4. For example, reference sign P is not given in FIG. 10; however, in the description irrelevant to the position of the filter pixel portion $P_{i,j}$, subscripts i and j are omitted and the filter pixel portion is simply referred to as the filter pixel portion P in some cases. The same is also applied to the first colored layer center $C_R$, the second colored layer center $C_G$, the third colored layer center $C_B$, and the like.

In the following, particularly, in a case where the first colored layer 3R, the second colored layer 3G, and the third colored layer 3B at the filter pixel portion $P_{i,j}$ are pointed out, the first colored layer 3R, the second colored layer 3G, and the third colored layer 3B at the filter pixel portion $P_{i,j}$ are respectively referred to as colored layer $F^1_{i,j}$, $F^2_{i,j}$, and $F^3_{i,j}$ by using superscripts 1, 2, 3 in some cases.

In particular, the first colored layer center $C_R$, the third colored layer center $C_B$, and the third colored layer center $CB_B$ at the filter pixel portion $P_{i,j}$ are referred to as colored layer centers $C^1_{i,j}$, $C^2_{i,j}$, and $C^3_{i,j}$ in some cases.

The straight grid line Lrgy in qth (here, q is an integer of $1 \leq q \leq J$) column in which colored layers $F^1_{i,j}$ and $F^2_{i,j}$ are disposed is referred as to straight grid line $L1y_q$. The straight grid line Lby in qth (here, q is an integer of $1 \leq q \leq J$) column in which colored layers $F^3_{i,j}$ are disposed is referred as to straight grid line $L2y_q$ in some cases.

When the positional deviation amount of the colored layer $F^k_{i,j}$ (here, k=1, 2, 3, unless otherwise noted, the same is applied to the following) from the lattice point in the main scanning direction is defined by a colored layer positional deviation amount $\delta F^k_{i,j}$, and the inherent component of the positional deviation is denoted by $\delta F^k_0(i)$, and the vibration component of the positional deviation is denoted by $\delta F^k x(j)$, the relation thereof is represented by the following Equation (17).

$$\delta F^k_{i,j} = \delta F^k_0(i) + \delta F^k x(j) \quad (k=1,2,3) \tag{17}$$

The colored layer $F^k_{i,j}$ can be measured from each colored layer $F^k_{i,j}$ of the color filter 11. Since the vibration component $\delta F^k x(j)$ is vibrated periodically in the sub-scanning direction, an average value relating to j becomes zero. Accordingly, the inherent component $\delta F^k_0(i)$ is obtained by the following Equation (18).

$$\delta F^k_0(i) = \frac{1}{J} \sum_{j=1}^{J} \delta F^k_{i,j} \quad (k=1, 2, 3) \tag{18}$$

The inherent component $\delta F^k_0(i)$ of the positional deviation of the colored layer $F^k_{i,j}$ varies depending on i corresponding to the position of the colored layer $F^k_{i,j}$ in the main scanning direction.

In the present embodiment, as will be described below, relative positions of the ink jet heads each forming the colored layer $F^k_{i,j}$ can be changed independently on each other.

Although not particularly shown, the colored layer positional deviation amount $\delta F^k_{i,j}$ in the color filter 11 varies depending on j corresponding to a position of the colored layer $F^k_{i,j}$ in the main scanning direction, and varies around zero on the whole.

When the maximum value of the colored layer positional deviation amount $F^k_{i,j}$ is denoted by $\delta F^k \max(i)$ and the minimum value thereof is denoted by $\delta F^k \min(i)$, the range $EF_k(i)$ of the colored layer positional deviation amount $\delta F^k_{i,j}$ in ith row is defined as the following Equation (19).

$$EF_k(i) = \delta F^k \max(i) - \delta F^k \min(i) \quad (k=1,2,3) \tag{19}$$

The range $EF_k(i)$ results from the production error of the ink jet head. Therefore, the range $EF_k(i)$ should match with a head error range $E_{kH}$. The head error range $E_{kH}$ is defined as a range of the deviation amount from the designed position of the ink jet nozzles, as the same with the first embodiment.

However, since the colored layer positional deviation amount $\delta F^k_{i,j}$ varies by being affected by the random error in the main scanning direction, an average range $EF_{kave}$ obtained by averaging the range $EF_k(i)$ with respect to i is used as a good estimation value of the head error range $E_{kH}$. The average range $EF_{kave}$ is defined by the following Equation (20).

$$EF_{kave} = \frac{1}{I} \sum_{i=1}^{I} EF_k(i) \quad (k=1, 2, 3) \tag{20}$$

In the color filter 11, the average range $EF_{kave}$ is 1 μm to 10 μm.

When the average range $EF_{kave}$ is less than 1 μm, even the position of the colored layer $F^k_{i,j}$ is not changed periodically, it is difficult to see the density unevenness in the main scanning direction due to the pitch error of the colored layer $F^k_{i,j}$.

When the average range $EF_{kave}$ is greater than 10 μm, as will be described later, it is required to increase the vibration component of the positional deviation of the colored layer $F^k_{i,j}$. Therefore, the image quality of the display is deteriorated depending on the size of the colored layer $F^k_{i,j}$.

When excluding the random error, the vibration component $\delta F^k x(j)$ is represented by the following Equations (21) and (22).

$$\delta F^k x(j) = \Delta X_k \sin\left(\frac{2\pi}{p_k} \cdot y + \alpha_k\right) \quad (k = 1, 2, 3) \tag{21}$$

$$y = y_{k_1} + dky \cdot (j-1) \quad (k = 1, 2, 3) \tag{22}$$

$$0.5 \cdot \frac{EF_{kave}}{2} \leq \Delta X_k \leq 1.5 \cdot \frac{EP_{kave}}{2} \quad (k = 1, 2, 3) \tag{23}$$

Here, $\Delta X_k$ is a constant coefficient representing an amplitude. $p_k$ is wavelength of the vibration ($1/p_k$ is a spatial frequency of vibration). $y_{k1}$ is a position coordinate of the colored layer center $C^k_{i,j}$ in the y direction. $\alpha_k$ is a constant that represents an initial phase of the vibration component.

Each $\Delta X_k$ can be a value different from each other, in a range satisfying above Equation (26).

Each wavelength $p_k$ is appropriately set according to the size of the colored layer $F^k_{i,j}$ and the like such that it is difficult to see stripe shaped unevenness which will be described later. For example, the wavelength $p_k$ may be selected from a range of 1 mm to 50 mm.

Specifically, for example, while changing the wavelength of the vibration, trial production of the color filter 11 is performed and single color display for each color is performed, thereby evaluating the stripe shaped unevenness. Then, the wavelength $p_k$ can be determined.

It can be statistically confirmed that the vibration component $\delta F^k x(j)$ in the color filter 11 satisfies above Equations (21), (22), and (23). Specifically, the vibration components $\delta F^k x(j)$ in each row may be measured, and the regression analysis may be performed.

Next, the method of manufacturing the color filter 11 will be described.

Figure 11:
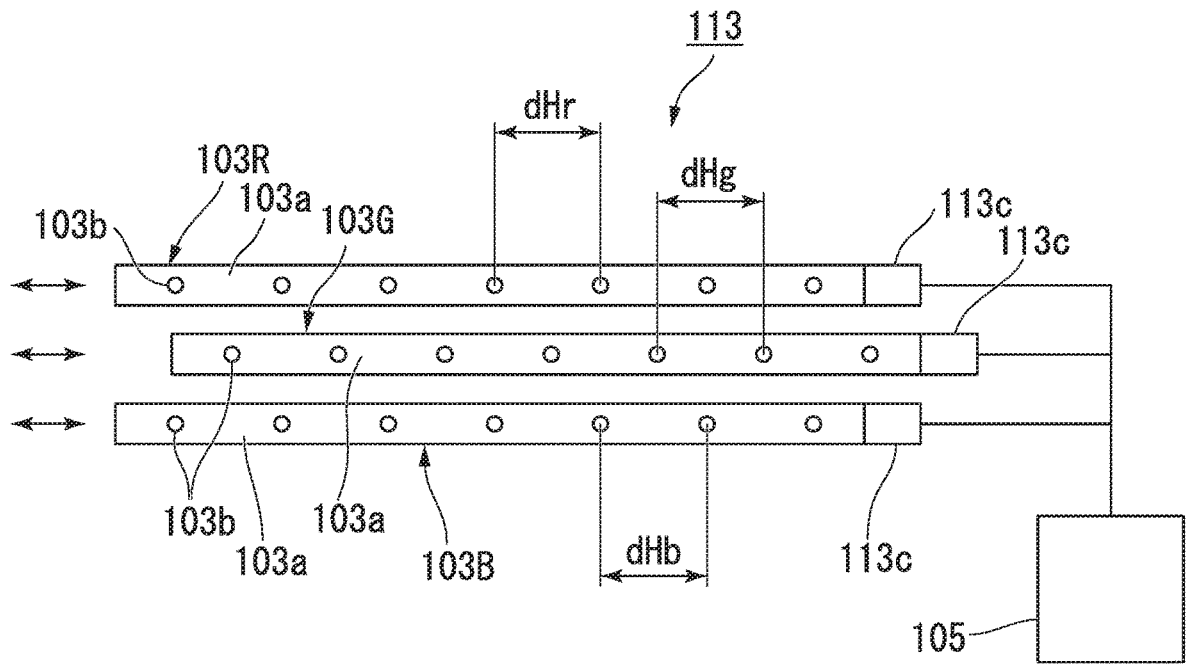
FIG. 11 is a schematic view showing a configuration of an ink jet head used to a method of manufacturing the color filter according to the second embodiment of the present invention.

FIG. 11 is a schematic view showing a configuration of an ink jet head used to the method of manufacturing the color filter according to the second embodiment of the present invention.

FIG. 6 shows an example of an ink jet device 110 for manufacturing the color filter 11.

The ink jet device 110 includes an ink jet head portion 113 (ink jet head), instead of the ink jet head portion 103 of the ink jet device 100 according to the first embodiment.

Hereinafter, description will be made by focusing on the different points from the first embodiment.

As shown in FIG. 11, the ink jet head portion 113 includes the ink jet heads 103R, 103G, and 103B (sub-heads) as those of the first embodiment and the head vibrating portion 113c.

In the present embodiment, the ink jet heads 103R, 103G, and 103B are fixed with respect to a supporting member of the ink jet head unit 102 (not shown) through the head vibrating portions 113c.

The head vibrating portion 113c is a device part causing the ink jet heads 103R, 103G, and 103B to respectively and independently vibrate for a long period in the main scanning direction.

The moving stage 104 of the present embodiment performs only the short period vibration of the first embodiment.

The ink jet heads 103R, 103G, and 103B are disposed on the center position of the vibration by the head vibrating portion 113c so as to have the relative position as those of the first embodiment.

A configuration of each head vibrating portion 113c is not limited, as long as the head vibrating portion 113c can cause the ink jet heads 103R, 103G, and 103B to vibrate for a long period, in the main scanning direction, corresponding to the vibration component of the positional deviation of each colored layer in the color filter 11.

For example, each head vibrating portion 113c may use a piezoelectric element as a driving source.

Each head vibrating portion 113c is electrically connected to the controller 105.

The controller 105 of the present embodiment causes each head vibrating portion 113c to vibrate by applying the vibration waveform which will be described later to each head vibrating portion 113c.

The ink jet device 110 can manufacture the color filter 11 by performing the same operations as those of the first embodiment, excepting that each head vibrating portion 113c independently performs the long period vibration in the first embodiment.

In the present embodiment, the ink jet heads 103R, 103G, and 103B respectively have head error range $E_{kH}$ (here, k=1, 2, 3) as in the first embodiment.

The controller 105 of the present embodiment moves the substrate 2 in the Y direction at a constant speed V, by driving the moving table 101 (first operation).

In parallel with this, the controller 105 causes the moving stage 104 to vibrate for short period in the X direction, thereby causing each head vibrating portion 113c to vibrate for a long period.

Accordingly, the ink jet heads 103R, 103G, and 103B perform vibration, in the main scanning direction, in which the short period vibration by the moving stage 104 and the long period vibration by each head vibrating portion 113c are combined.

The long period vibration in the present embodiment is a vibration changing the vibration component $\delta F^k x(j)$ of the positional deviation of the colored layer $F^k_{i,j}$ according to above Equations (21) to (23) (fourth operation).

The long period vibration performed by each of the head vibrating portions 113c is represented by the following Equations (24) and (25) using a displacement of the ink jet heads 103R, 103G, and 103B in the X direction as $X_k$.

$$x_k = \Delta X_k \sin\left(\frac{2\pi}{p_k} \cdot y_k + \beta_k\right) (k = 1, 2, 3) \quad (24)$$

-continued $$y_k = V \cdot t \ (k = 1, 2, 3) \quad (25)$$

$$0.5 \cdot \frac{E_{kH}}{2} \leq \Delta X_k \leq 1.5 \cdot \frac{E_{kH}}{2} \ (k = 1, 2, 3) \quad (26)$$

Here, t represents time. The amplitude $\Delta X_k$ is a constant selected from the range of Equation (26). The head error range $E_{kH}$ in Equation (26) can be obtained by detecting a nozzle position of each nozzle portion 103b of the ink jet head portion 113. The head error range $E_{kH}$ may be obtained by performing ink discharging from the ink jet head portion 113 to detect a position of the discharged ink.

The wavelength $p_k$ is a constant the same as that of Equation (19). $\beta_k$ is a constant that represents an initial phase.

The wavelength $p_k$ of the long period vibration is longer than the width of each colored layer in the sub-scanning direction.

The second operation and the third operation in the present embodiment are performed in the same manner as the first embodiment.

According to the ink jet device 110, the color filter 11 that has the suitable vibration component of positional deviation, according to the magnitude of head error range $E_{kH}$ in each of the ink jet heads 103R, 103G, and 103B can be manufactured.

However, since watching the stripe shaped unevenness is different depending on the observer, a suitable size may be determined by a trial production or an experiment in which $\Delta X$ is variously changed. When $\Delta X$, is selected from the range of above Equation (24), the stripe shaped unevenness can be eliminated.

According to the present embodiment, the colored layer formed by the ink jet head in which head error range $E_{kH}$ is small can reduce the positional deviation from the lattice point. Therefore, change in the image quality due to the vibration component of the positional deviation can be suppressed.

As described above, according to the color filter 11 and method of manufacturing the same according to the present embodiment, the positions of the first colored layer 3R, the second colored layer 3G, and the third colored layer 3B in the main scanning direction are changed periodically in the sub-scanning direction, in each column in which the colored layers are arranged in the sub-scanning direction. Therefore, the generation of the stripe shaped unevenness due to the non-uniformity of the nozzle pitch of the ink jet head portion 113 can be suppressed.

Here, in the present embodiment, correspondence with the term of claims will be described.

In the present embodiment, a case where the colored layer of the color filter is formed of the filter pixel portion P, that is the pixel portion in which the first colored layer 3R, the second colored layer 3G, and the third colored layer 3B as unit colored layers are assembled, is an exemplary example.

However, in the present embodiment, each unit colored layer is formed by vibrating three sub-heads independently on each other to generate an independent vibration component in each unit colored layer. In the present embodiment, the unit colored layers respectively correspond to the colored layers.

Therefore, the average range $EF_{kave}$ in above Equation (23) corresponds to the colored layer positional deviation range E in above Equation (1).

The vibration component $\delta F^k x(j)$ in above Equation (21) corresponds to the displacement x in above Equation (2).

The head error range $E_{kH}$ in above Equation (26) corresponds to the head error range $E_H$ in above Equation (3).

In the description of the first and second embodiments, a case where the first colored layer 3R and the second colored layer 3G are disposed on an identical straight grid line in the main scanning direction has described as an example. However, the first colored layer 3R and the second colored layer 3G may be disposed on different straight grid lines.

In the description of the first and second embodiments, a case where the color filter includes three types of colored layers formed of the three colors of the first colored layer 3R, the second colored layer 3G, and the third colored layer 3B has described as an example. However, the type of the colored layer of the color filter is not limited thereto.

For example, the type of the colored layer may be one type, two types, or four or more types.

In the description of the first and second embodiments, a case where the unit colored layers have the same shape and the same size has been described as an example. However, the shape or the size of the unit colored layer may not be identical.

In the description of the first and second embodiments, a case where the long period vibration is a sine-wave vibration has described as an example. However, the vibration is not limited to the sine-wave vibration as long as the vibration is periodic vibration. For example, rectangular wave vibration, serrated vibration, or the like may be used.

The preferred embodiments of the present invention have described above; however the present invention is not limited to the embodiments and the modified example. An addition, omission, substitution, and other changes of the configuration can be made in a range not departing from the present invention.

In addition, the present invention is not limited by the above description, but is limited only by appended CLAIMS.

EXAMPLES

Examples of the first embodiment will be described in the following.

Figure 12:
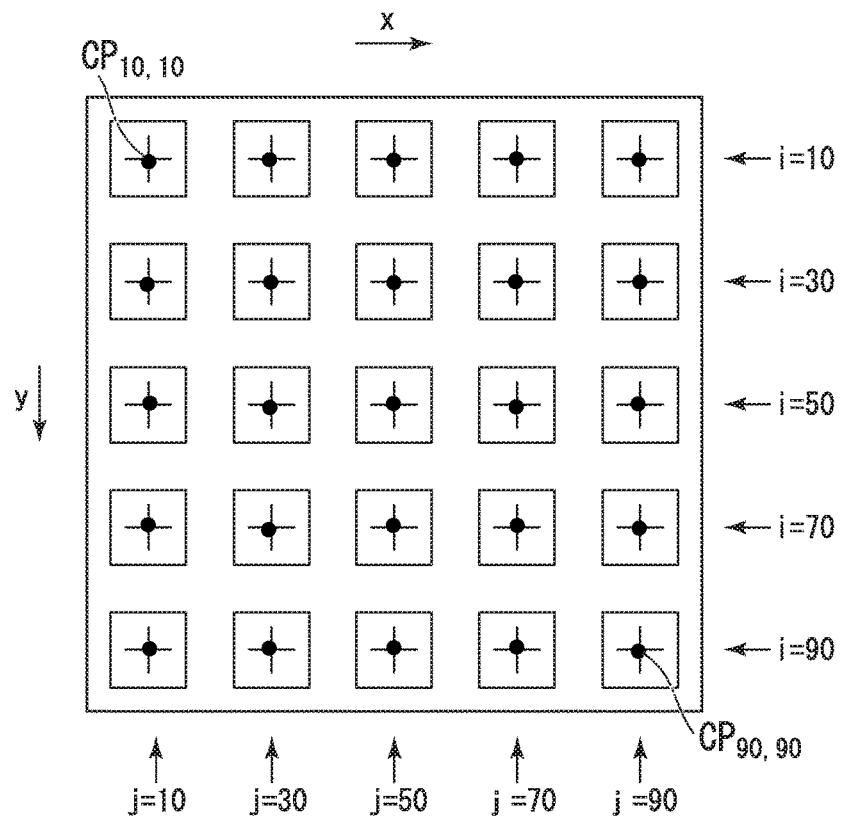
FIG. 12 is a schematic view showing positional deviation of each pixel portion of a sample #1 (Comparative Example 1).
Figure 13:
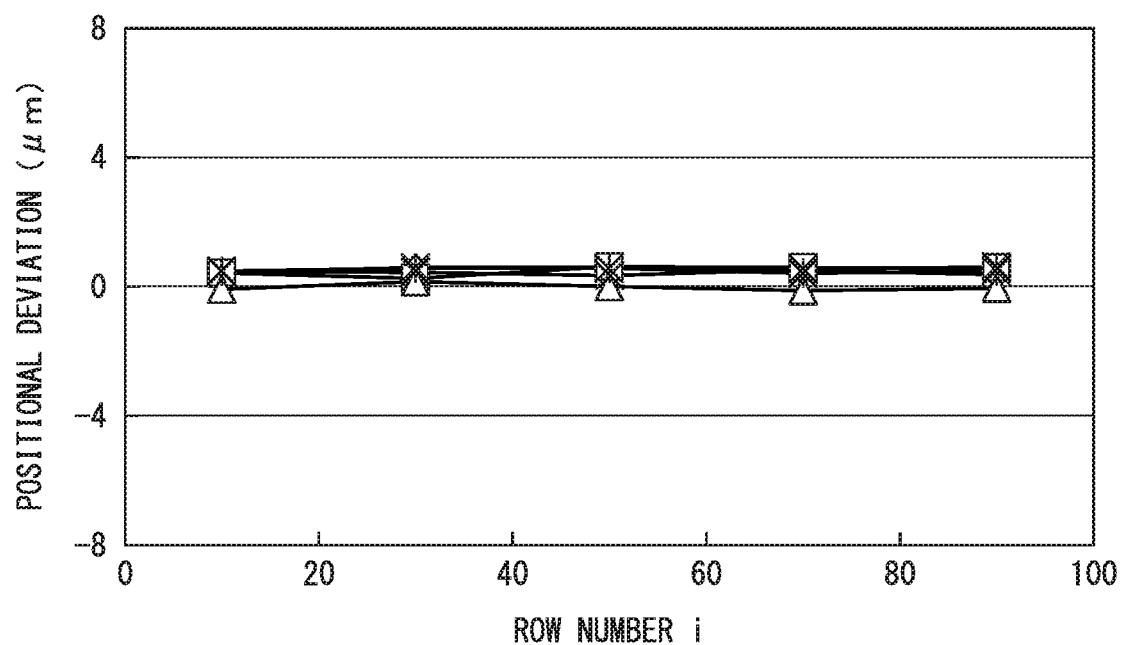
FIG. 13 is a graph showing positional deviation in an x direction of each pixel portion in a row of a sample #1 (Comparative Example 1).
Figure 14:
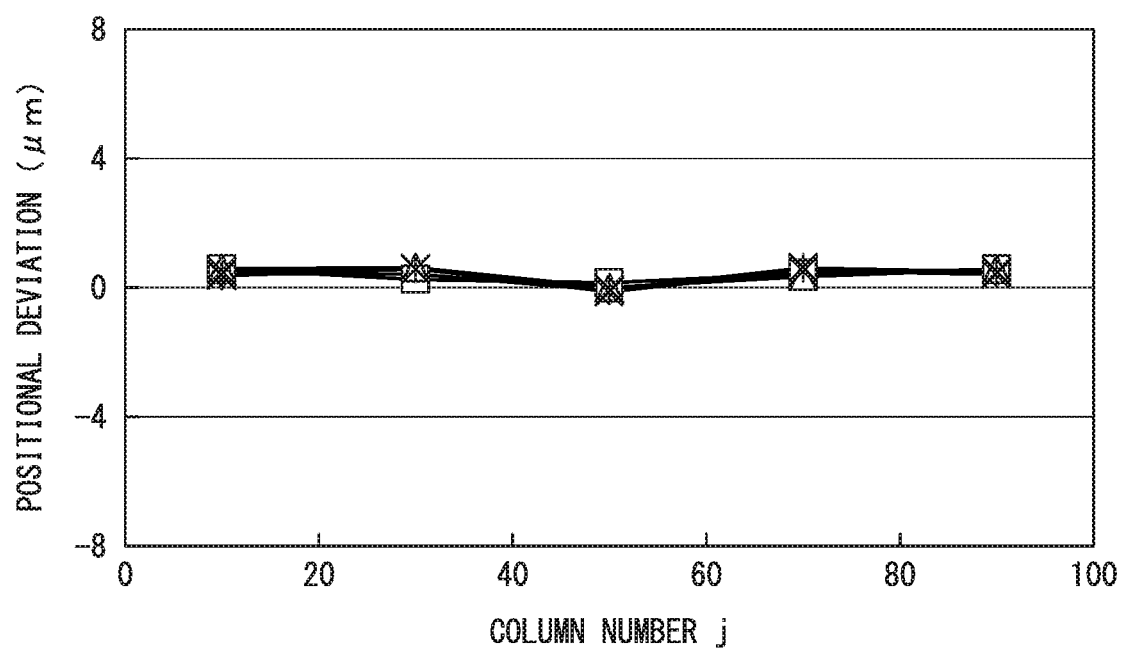
FIG. 14 is a graph showing positional deviation in the x direction of each pixel portion in a column of the sample #1 (Comparative Example 1).
Figure 15:
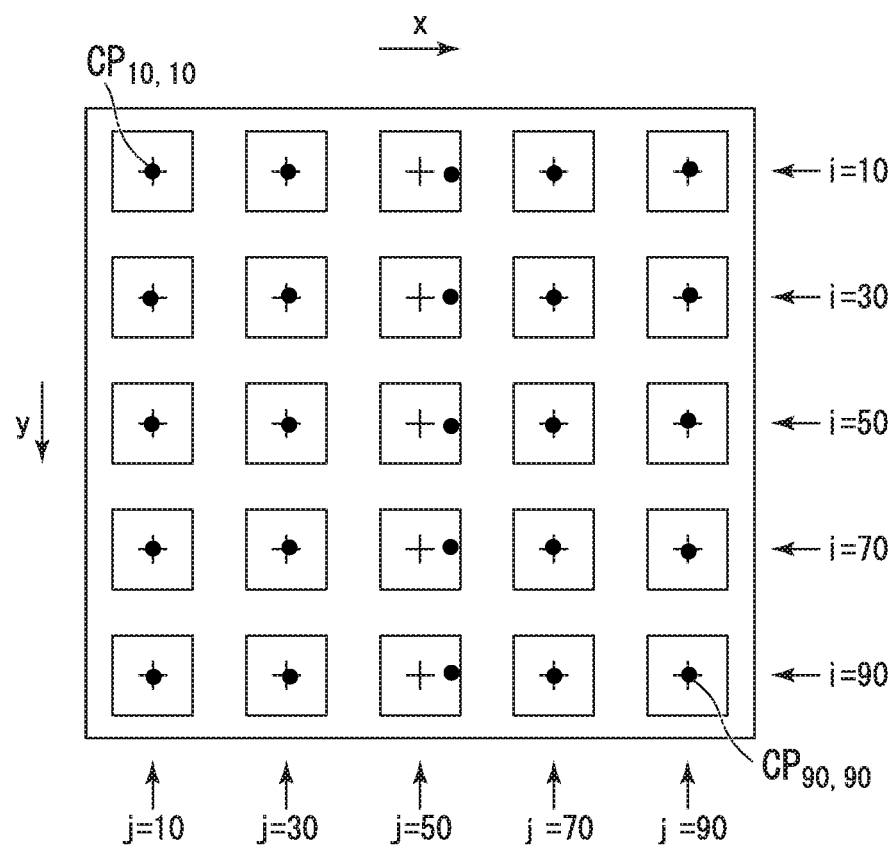
FIG. 15 is a schematic view showing positional deviation of each pixel portion of a sample #2 (Comparative Example 2).
Figure 16:
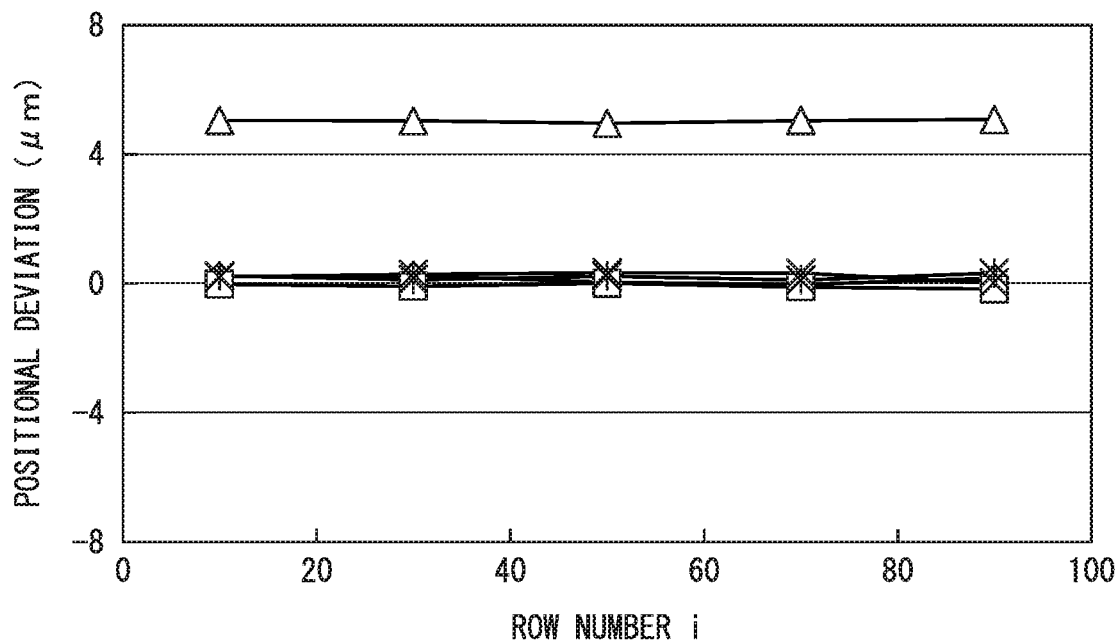
FIG. 16 is a graph showing positional deviation in an x direction of each pixel portion in a row of a sample #2 (Comparative Example 2).
Figure 17:
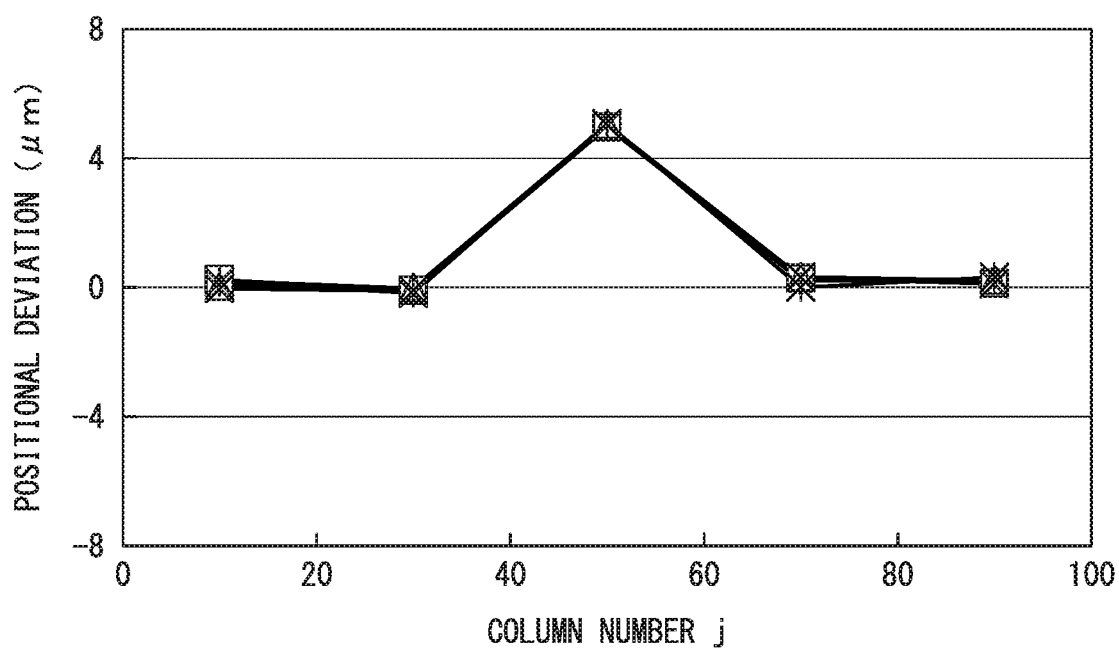
FIG. 17 is a graph showing positional deviation in the x direction of each pixel portion in a column of the sample #2 (Comparative Example 2).
Figure 18:
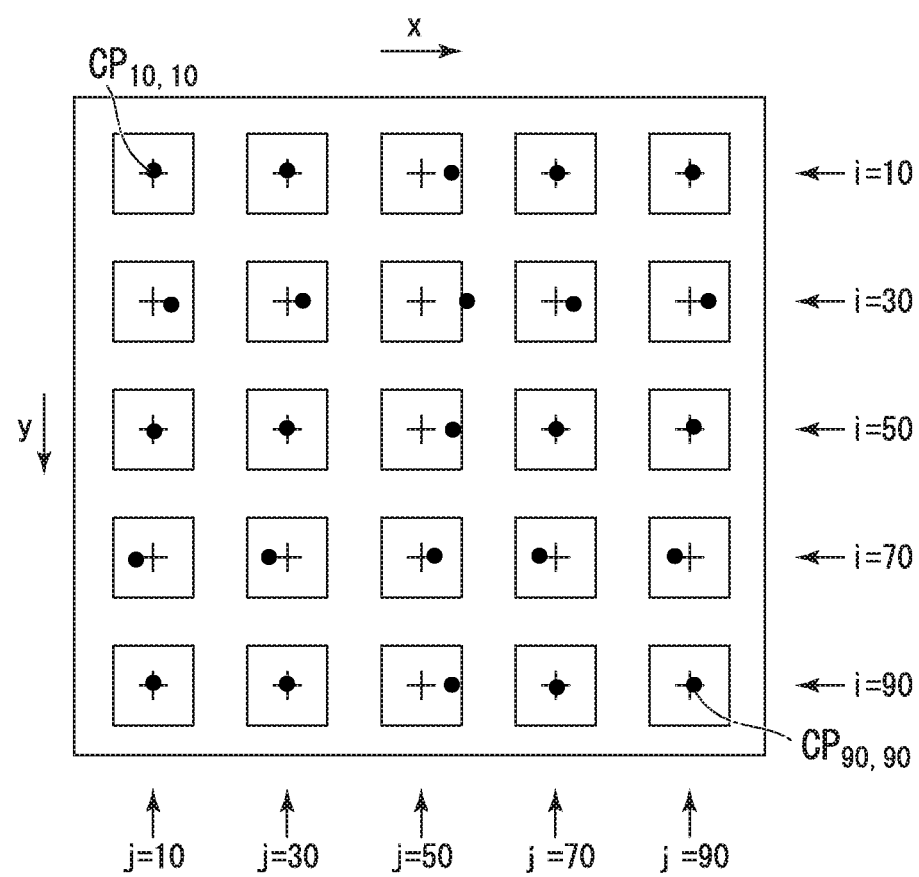
FIG. 18 is a graph showing positional deviation in an x direction of each pixel portion in a column of a sample #3 (Example 1).
Figure 19:
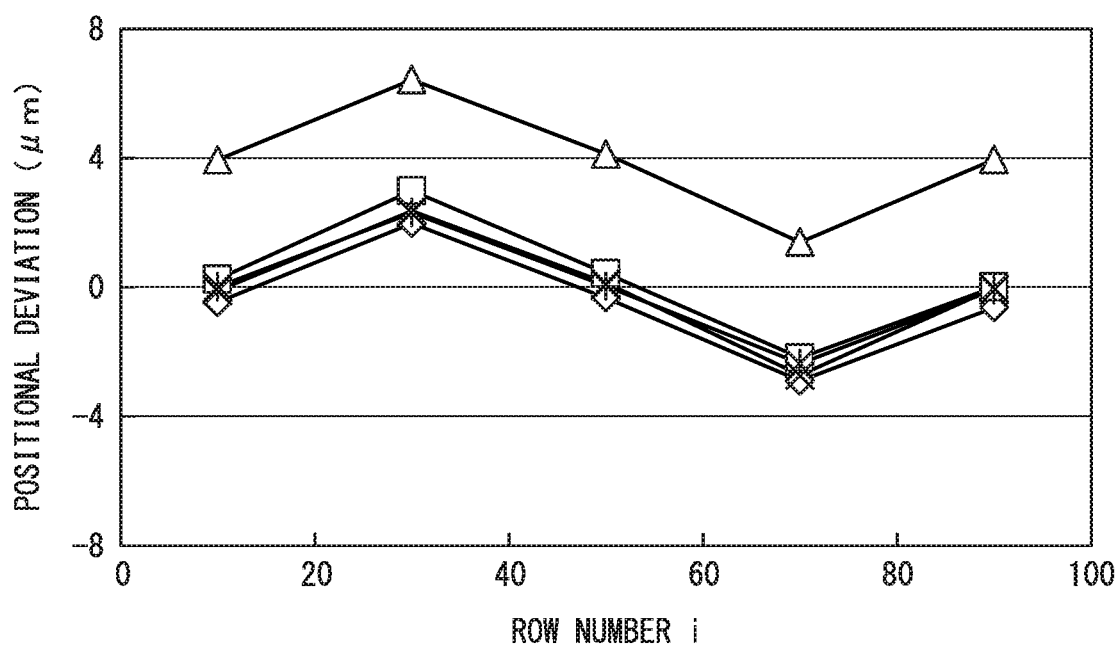
FIG. 19 is a graph showing positional deviation in an x direction of each pixel portion in a row of a sample #3 (Example 1).
Figure 20:
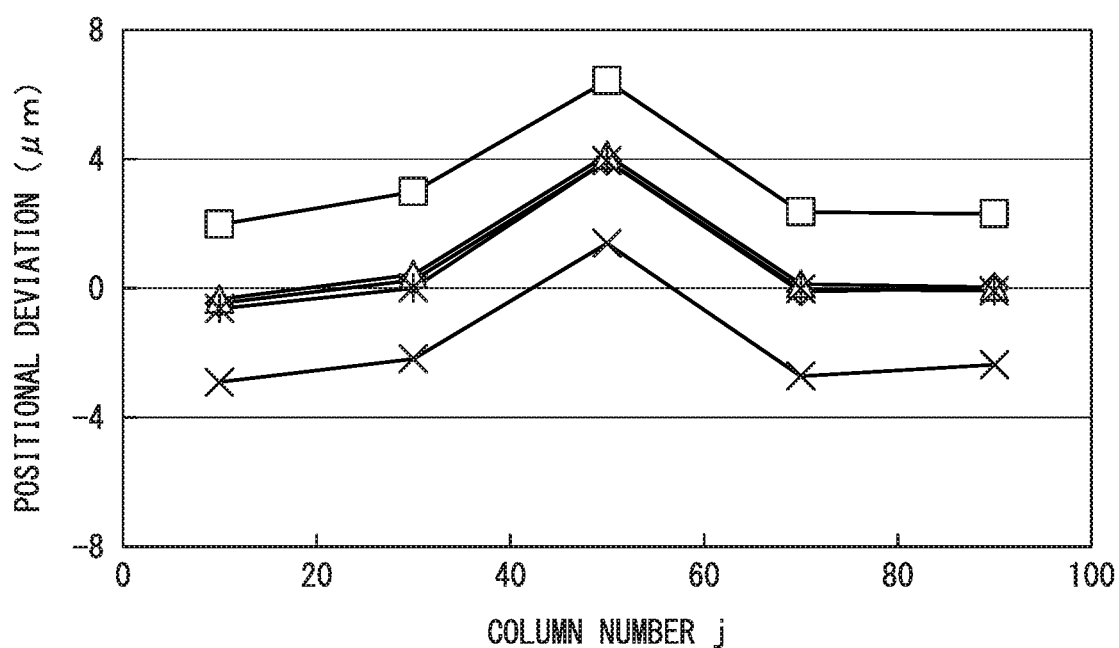
FIG. 20 is a graph showing positional deviation in the x direction of each pixel portion in a column of the sample #3 (Example 1).
Figure 21:
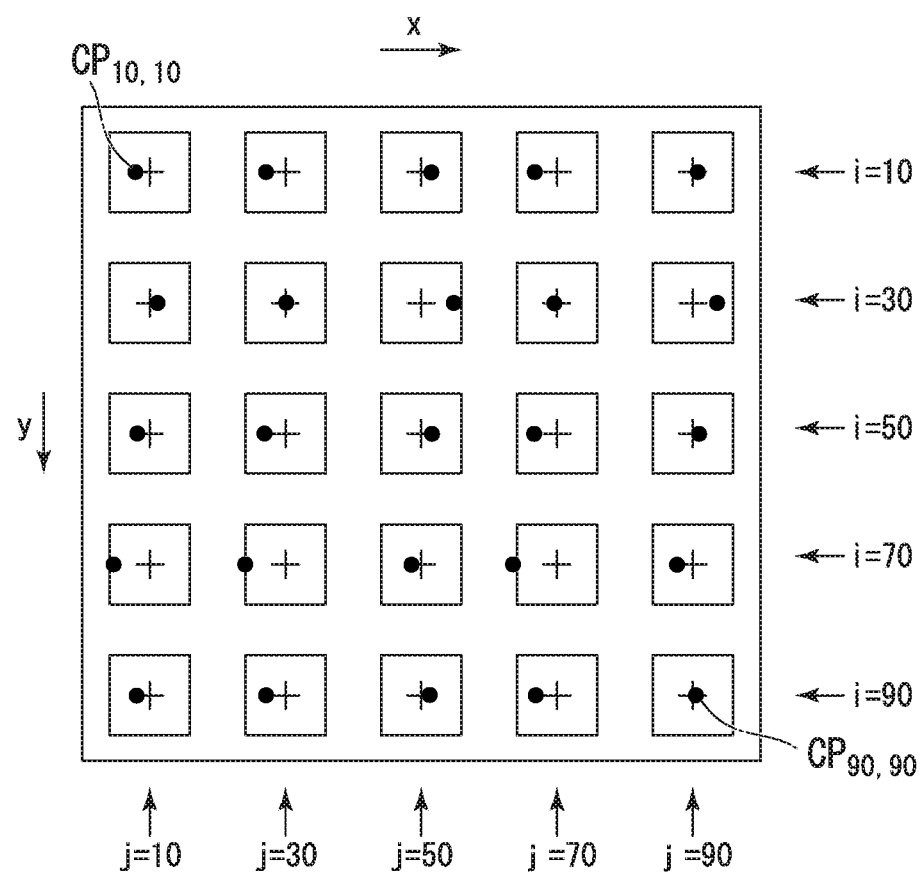
FIG. 21 is a graph showing positional deviation in an x direction of each pixel portion of in a column a sample #4 (Example 2).
Figure 22:
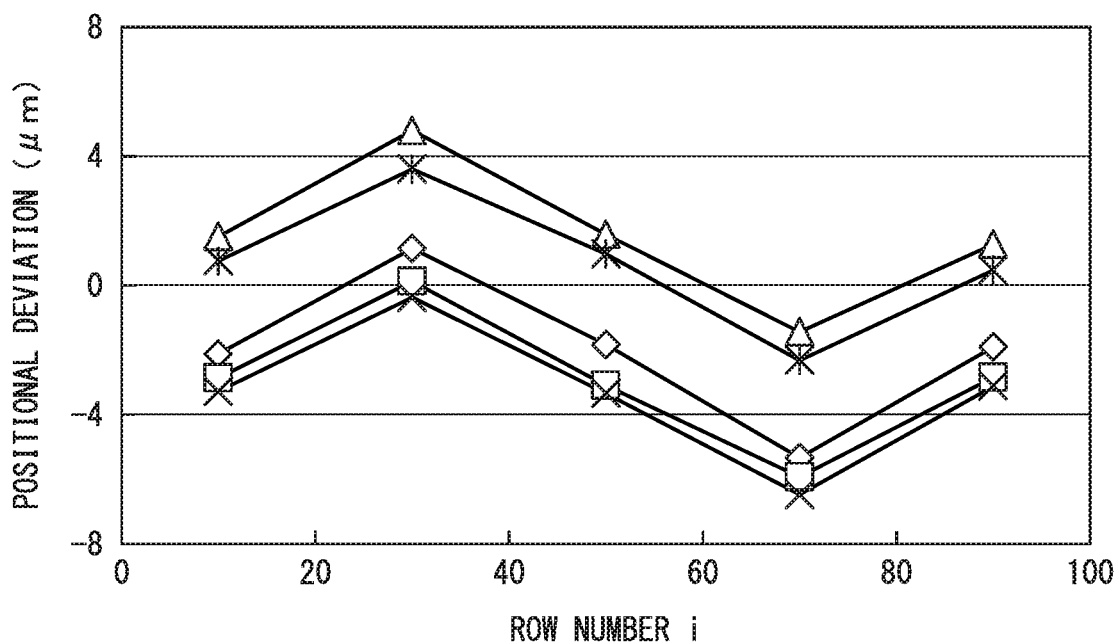
FIG. 22 is a graph showing positional deviation in the x direction of each pixel portion in a row of a sample #4 (Example 2).
Figure 23:
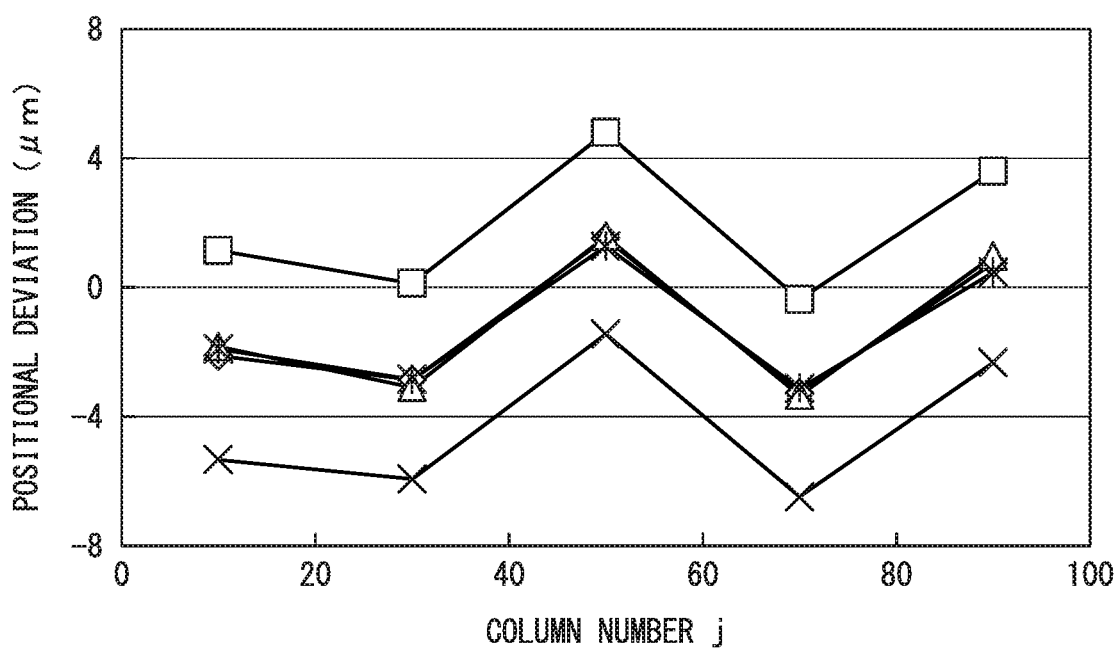
FIG. 23 is a graph showing positional deviation in the x direction of each pixel portion in a column of the sample #4 (Example 2).

FIG. 12 is a schematic view showing positional deviation of each pixel portion of a sample #1 (Comparative Example 1). FIG. 13 is a graph showing positional deviation in an x direction of each pixel portion in a row of a sample #1 (Comparative Example 1). FIG. 14 is a graph showing positional deviation in the x direction of each pixel portion in a column of the sample #1 (Comparative Example 1). FIG. 15 is a schematic view showing positional deviation of each pixel portion of a sample #2 (Comparative Example 2). FIG. 16 is a graph showing positional deviation in an x direction of each pixel portion in a row of a sample #2 (Comparative Example 2). FIG. 17 is a graph showing positional deviation in the x direction of each pixel portion in a column of the sample #2 (Comparative Example 2). FIG. 18 is a graph showing positional deviation in an x direction of each pixel portion in a column of a sample #3 (Example 1). FIG. 19 is a graph showing positional deviation in an x direction of each pixel portion in a row of a sample #3 (Example 1). FIG. 20 is a graph showing positional deviation in the x direction of each pixel portion in a column of the sample #3 (Example 1). FIG. 21 is a graph showing positional deviation in an x direction of each pixel portion in a column of a sample #4 (Example 2). FIG. 22 is a graph showing positional deviation in the x direction of each pixel portion in a row of a sample #4 (Example 2). FIG. 23 is a graph showing positional deviation in the x direction of each pixel portion in a column of the sample #4 (Example 2).

In each graph, a horizontal axis represents a row number i or a column number j, and a vertical axis represents a positional deviation (μm). In FIGS. 13, 16, 19, and 22, data is shown by ◇ marks representing j=10, w marks representing j=30, ∆ marks representing j=50, x marks representing j=70, and * marks representing j=90. In FIGS. 14, 17, 20, and 23, data is shown by ◇ marks representing i=10, □ marks representing i=30, ∆ marks representing i=50, x marks representing i=70, and * marks representing i=90.

In order to study a condition of the vibration component in which the stripe shaped unevenness is not generated in the color filter 1, samples of examples and comparative example were produced as follows.

[Production of Image Receiving Layer]

30 parts of methyl methacrylate, 20 parts of 2-hydroxyethyl methacrylate, 45 parts of vinyl pyrrolidone, and 5 parts of polyethylene glycol dimethacrylate were introduced into a four-necked flask including a stirrer, a nitrogen inlet tube, and a reflux condenser tube. Further, 240 parts of isopropyl alcohol, 140 parts of water, and 20 parts of γ-butyrolactone were added to the flask, and the mixture was uniformly dissolved.

The obtained solution was stirred on an oil bath under a nitrogen atmosphere. A small amount (approximately 0.5 g) of α,α'-azobisisobutyronitrile was added to the solution to initiate polymerization.

The solution was heated and stirred on the oil bath at 60° C. for six hours. Accordingly, a polymer solution A that was colorless and viscous was obtained.

Then, the substrate 2 was coated with the polymer solution A such that a film thickness became 5 μm.

The substrate 2 coated with the polymer solution A was dried at 80° C. for three minutes. As a result, the image receiving layer 4 was formed on the substrate 2.

[Preparation of Pigment Dispersion]

The following dispersant, solvents, and resin input to a stainless beaker. While heating the stainless beaker on a hot plate at 65° C., the content of the stainless beaker was dissolved by heating and stirring for one hour.

After the following pigment was added to the obtained solution, the solution input to a glass bottle together with 200 g of zirconia beads having a diameter of 0.5 mm, the glass bottle was sealed, and a dispersion treatment was performed for eight hours with a paint shaker. Thereafter, the zirconia beads were removed from the solution. Thereby, a pigment dispersion (RED) having the following composition was prepared.

A pigment dispersion (GREEN) and a pigment dispersion (BLUE) were prepared by changing only pigments using the same method.

| [Composition of pigment dispersion (RED)] | |
|---|---|
| Dispersion: AJISPER PB824 | 9 parts |
| Resin: APG-200 | 6 parts |
| Solvent: EDGAC | 61 parts |
| Solvent: PMA | 3 parts |
| RED pigment: Pigment Red177 | 21 parts |
| [Composition of pigment dispersion (GREEN)] | |
| Dispersion: AJISPER PB824 | 7 parts |
| Resin: APG-200 | 6 parts |
| Solvent: EDGAC | 64 parts |

-continued

| | |
|---|---|
| Solvent: PMA | 3 parts |
| GREEN pigment: Pigment GREEN7 | 20 parts |
| [Composition of pigment dispersion (BLUE)] | |
| Dispersion: AJISPER PB824 | 5 parts |
| Resin: APG-200 | 7 parts |
| Solvent: EDGAC | 62 parts |
| Solvent: PMA | 4 parts |
| BLUE pigment: Pigment BLUE15 | 22 parts |

[Preparation of Ink]

30 parts of benzyl alcohol, 30 parts of carbitol acetate, and 20 parts of acrylic resin (MW 30) were mixed with 20 parts of each of the obtained pigment dispersions and were stirred. Each of the obtained solutions was filtered with a mesh filter having a diameter of 5 µm. In this way, red, green, and blue inks were prepared.

[Formation of Pixel Portion]

The first colored layer 3R, the second colored layer 3G, and the third colored layer 3B were printed on the substrate 2 by the ink jet device 100 using each of the obtained inks. A sample of the color filter 1 was produced.

In the production of the sample, the ink was discharged from one ink jet nozzle to perform printing. By using only one ink jet nozzles, it was possible to control the positional deviation of the colored layer generated by variation of the nozzle positions.

In order to produce the one unit colored layer, 5 droplets (30 µL) of nominal ink droplets of 6 µL per each scanning were impacted on five locations at intervals of 30 µm. The scanning was performed five times at intervals of 30 µm on an axis perpendicular to the scanning direction. Accordingly, a unit colored layer having a square shape with one side of 230 µm (=Wx=Wy) could be produced. 100 colored pixels with one side of 230 µm were formed on the substrate 2 in each of the x direction and the y direction at a pitch of 500 µm (=d1$x$=d1$y$=, d2$x$=d2$y$=d3$x$=d3$y$).

The arrangement of the first colored layer 3R, the second colored layer 3G, and the third colored layer 3B is as shown in FIG. 2.

The conditions of the produced sample and evaluation results of the stripe shaped unevenness are shown in the following Table 1.

FIG. 12, in order to easily see, the positional deviations at $CP_{i,j}$ column's positions (here, i=10, 30, 50, 70, 90 and j=10, 30, 50, 70, 90) are exaggeratingly drawn (the same is applied to FIGS. 15, 18, and 21 below). Each measured data of the positional deviations in the x direction in the row and the column are respectively shown in FIGS. 13 and 14.

The positional deviation of the pixel portion was measured using MARCURY manufactured by V-Technology Co., Ltd.

Sample #2 is a color filter of Comparative example 2 in which a fixed component of the positional deviation in the x direction was forcibly formed, and the vibration component of the positional deviation was set to 0. As shown in Table 1, the average range $EP_{ave}$ of Sample #2 was 5.1 µm.

The positional deviation of Sample #2 in the x direction and the y direction is schematically shown in FIG. 15. Each measured data of the positional deviations in the x direction in the row and the column are respectively shown in FIGS. 16 and 17.

Sample #3 is a color filter of Example 1 produced by forcibly forming the fixed component of positional deviation in the x direction and adding the vibration component of the positional deviation.

The moving speed V of the moving table 101 was 75 mm/sec. The frequency f of the long period vibration was 10 Hz. Therefore, the wavelength p is 7.5 mm.

As shown in Table 1, the average range $EP_{ave}$ of Sample #3 was 4.4 µm. The total amplitude 2·ΔX thereof was 5 µm.

The positional deviation of Sample #3 in the x direction and the y direction is schematically shown in FIG. 18. Each measured data of the positional deviations in the x direction in the row and the column are respectively shown in FIGS. 19 and 20.

Sample #4 is a color filter of Example 2 produced by forcibly forming the fixed component of positional deviation in the x direction and setting the vibration component of the positional deviation to zero. As shown in Table 1, the average range $EP_{ave}$ of Sample #2 was 4.9 µm. Total amplitude 2·ΔX thereof was 6.2 µm.

The positional deviation of Sample #4 in the x direction and the y direction is schematically shown in FIG. 21. Each measured data of the positional deviations in the x direction in the row and the column are respectively shown in FIGS. 22 and 23.

TABLE 1

| | TRIAL SAMPLE NO. | | | | | | | | | | | | | | | | | | |
|---|---|---|---|---|---|---|---|---|---|---|---|---|---|---|---|---|---|---|---|
| | #1 | #2 | #3 | #4 | #5 | #6 | #7 | #8 | #9 | #10 | #11 | #12 | #13 | #14 | #15 | #16 | #17 | #18 | #19 |
| AVERAGE RANGE $EP_{ave}$ (µm) | 0.59 | 5.1 | 4.4 | 4.9 | 1 | 1 | 1 | 5 | 5 | 5 | 10 | 10 | 10 | 20 | 20 | 20 | 30 | 30 | 30 |
| TOTAL AMPLITUDE 2·ΔX (µm) | 0 | 0 | 5 | 6.2 | 0.5 | 1 | 2 | 3 | 5 | 8 | 5 | 10 | 15 | 10 | 20 | 30 | 10 | 30 | 50 |
| UNEVENNESS EVALUATION RESULT | ○ | x | ○ | ○ | ○ | ○ | ○ | ○ | ○ | ○ | ○ | ○ | ○ | x | x | x | x | x | x |

Sample #1 is a color filter of Comparative example 1 produced by suppressing the positional deviation in the x direction and the y direction and setting the vibration component of the positional deviation to zero (ΔX=0). As shown in Table 1, the average range $EP_{ave}$ of sample #1 was 0.59 µm.

The positional deviation of Sample #1 in the x direction and the y direction is schematically shown in FIG. 12. In Sensory evaluations of Samples #1 to #4 were performed by determining whether 30 inspectors can visually recognize the stripe shaped unevenness. In Table 1, in a case of determining that 90% or more of inspectors cannot see the stripe shaped unevenness, the result was denoted by ○ (good). In a case of determining that more than 10% of inspectors can see the stripe shaped unevenness, the result was denoted by x (not good) (the same was applied to the evaluation of Samples #5 to #19 to be described).

As shown in Table 1, in Sample #1 (Comparative example 1), even in a case where the vibration component of the positional deviation was zero, the unevenness was evaluated as ○. On the contrary, according to Sample #2 (Comparative example 2), even in a case where the average range $EP_{ave}$ was 5.1 μm, the unevenness was evaluated as x.

On the other hand, in Samples #3 and #4, the average ranges $EP_{ave}$ were respectively 4.4 μm and 4.9 μm; however, Samples #3 and #4 have the vibration components respectively having the total amplitudes 2·ΔX of 5 μm and 6.2 μm, thereby evaluating the unevenness as a.

Samples #5 to #19 were produced in order to study how the unevenness evaluation changes depending on the value of the amplitude ΔX, in a case where a level of the average range $EP_{ave}$ was changed to 1 μm, 5 μm, 10 μm, 20 μm, and 30 μm. The combination of the average ranges $EP_{ave}$ and the total amplitudes 2·ΔX in Samples #5 to #19 is as shown in Table 1.

Samples #5 to #13 correspond to Examples 3 to 11 in which the average range $EP_{ave}$ is 1 μm to 10 μm.

Samples #14 to #19 correspond to Comparative examples 3 to 8 in which the average range $EP_{ave}$ is 20 μm or greater.

As shown in Table 1, while every unevenness of Samples #5 to #13 was evaluated as ○, unevenness of Samples #14 to #19 was evaluated as x.

In a case where the average range $EP_{ave}$ is small as 1 μm and 5 μm, even when ΔX is out of the range of above Equation (11), the unevenness was evaluated as ○ (Samples #7 and #10).

However, in a case where the average range $EP_{ave}$ is 20 μm or greater, even when the amplitude ΔX satisfies the range of above Equation (11), the unevenness was evaluated as x.

What is claimed is:

1. A color filter comprising:
   a substrate that transmits light; and
   a colored layer being formed by an ink jet ink, the colored layer being arranged on a virtual lattice point in a plurality of virtual lattice patterns arranged on the substrate with a first pitch in a first direction and a second pitch in a second direction,
   the colored layer being separated in the first direction and the second direction,
   wherein, in each row of the plurality of the virtual lattice patterns arranged in the first direction, when a maximum value is denoted by δmax and a minimum value is denoted by δmin in a positional deviation amount in the first direction between a center of the colored layer and the virtual lattice point, and a value obtained by averaging δmax−δmin in the virtual lattice patterns arranged in the first direction is defined as a colored layer positional deviation range E, the colored layer positional deviation range E is 1 μm to 10 μm,
   wherein, in each column of the plurality of the virtual lattice patterns arranged in the second direction, a position of the center of the colored layer in the first direction changes periodically with respect to the virtual lattice point,
   wherein the colored layer is configured with a plurality of unit colored layers, each of the unit colored layers is formed of a different type of ink, and positions of the unit colored layers are different in at least one of the first direction and second direction,
   wherein the plurality of the unit colored layers are respectively arranged on a plurality of virtual lattice points at positions different from each other in the virtual lattice patterns, and
   wherein, in each column of the plurality of the virtual lattice patterns, a position of the center of each of the unit colored layers in the first direction changes periodically with respect to each of the virtual lattice points.

2. The color filter according to claim 1,
   wherein when an amplitude of periodic change toward the first direction in the colored layer of each column is defined as an amplitude ΔX, the amplitude ΔX satisfies the following Equation (1).

$$0.5 \cdot \frac{E}{2} \leq \Delta X \leq 1.5 \cdot \frac{E}{2}. \tag{1}$$

3. The color filter according to claim 2,
   wherein, in each column, when a coordinate value of the center of the colored layer in the second direction is denoted by y, displacement x of the center of the colored layer in the first direction with respect to the lattice point is represented by the following Equation (2), $$x = \Delta X \sin\left(\frac{2\pi}{p} \cdot y + \alpha\right) \tag{2}$$

where, p is a constant that represents a wavelength of vibration longer than a width of the colored layer in the second direction, and a is a constant that represents an initial phase.

4. The color filter according to claim 1,
   wherein a pixel portion, in which at least the first unit colored layer and the second unit colored layer are assembled, is disposed on virtual pixel portion lattice points in a plurality of virtual pixel portion lattice patterns arranged with the first pitch in the first direction and the second pitch in the second direction, and
   wherein, in the plurality of the virtual pixel portion lattice patterns in the second direction, a position of a center of a virtual pixel portion, among the virtual pixel portion lattice points, in the first direction changes periodically with respect to the virtual pixel portion lattice points.

* * * * *

UNITED STATES PATENT AND TRADEMARK OFFICE
CERTIFICATE OF CORRECTION

PATENT NO. : 11,156,883 B2
APPLICATION NO. : 15/882341
DATED : October 26, 2021
INVENTOR(S) : Konno It is certified that error appears in the above-identified patent and that said Letters Patent is hereby corrected as shown below:

In the Claims

Column 32, Line 25:

In Claim 2, delete "Equation (1). $0.5 \cdot \frac{E}{2} \leq \Delta X \leq 1.5 \cdot \frac{E}{2}$ ... (1)" and insert -- Equation (1), $0.5 \cdot \frac{E}{2} \leq \Delta X \leq 1.5 \cdot \frac{E}{2}$ ... (1). --, therefor.

Column 32, Line 42:
In Claim 3, delete "a" and insert -- α --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*